(12) United States Patent
Mante

(10) Patent No.: US 11,828,316 B2
(45) Date of Patent: Nov. 28, 2023

(54) STORAGE, RECALL, AND USE OF TIGHTENING SPECIFICATIONS ON THREADED MECHANICAL FASTENERS

(71) Applicant: David M. Mante, Warwick, NY (US)

(72) Inventor: David M. Mante, Warwick, NY (US)

(*) Notice: Subject to any disclaimer, the term of this patent is extended or adjusted under 35 U.S.C. 154(b) by 0 days.

(21) Appl. No.: 17/813,354

(22) Filed: Jul. 19, 2022

(65) Prior Publication Data

US 2023/0139995 A1    May 4, 2023

Related U.S. Application Data

(60) Provisional application No. 63/265,552, filed on Dec. 16, 2021, provisional application No. 63/263,543, filed on Nov. 4, 2021.

(51) Int. Cl.
| | |
|---|---|
| *F16B 31/02* | (2006.01) |
| *B25B 23/142* | (2006.01) |
| *G06K 19/06* | (2006.01) |
| *B25B 23/147* | (2006.01) |
| *B25B 23/145* | (2006.01) |

(52) U.S. Cl.
CPC ........ *F16B 31/02* (2013.01); *G06K 19/06037* (2013.01); *B25B 23/145* (2013.01); *B25B 23/147* (2013.01); *B25B 23/1425* (2013.01)

(58) Field of Classification Search
CPC ......... B25F 5/00; B25B 21/002; B25B 21/02; B25B 23/14; B25B 23/1425; B25B 23/145; B25B 23/147; B25B 23/15; B06B 1/0662; F16B 31/00; F16B 31/02; F16B 31/04; F16B 2031/022; F16B 1/10; F16B 1/0071; F16B 35/06; G05B 19/4183; G06K 19/06037; G06K 2019/06262; G01L 5/246; G01N 2291/2691; G01N 2291/02827; Y10T 29/49007
See application file for complete search history.

(56) References Cited

U.S. PATENT DOCUMENTS

| | | | |
|---|---|---|---|
| 2,733,517 A | | 2/1956 | Gjersoe |
| 3,472,102 A | | 10/1969 | Dunlap et al. |
| 5,165,831 A | | 11/1992 | Yager et al. |
| 6,843,628 B1 | | 1/2005 | Hoffmeister et al. |
| 6,990,866 B2 | | 1/2006 | Kibblewhite |
| 7,441,462 B2 | * | 10/2008 | Kibblewhite ........... F16B 31/02 73/761 |
| 8,028,585 B2 | | 10/2011 | Kibblewhite |
| 9,339,926 B2 | | 5/2016 | Kibblewhite |

(Continued)

FOREIGN PATENT DOCUMENTS

| | | | |
|---|---|---|---|
| CN | 102034127 | * | 1/2011 |
| CN | 102034127 | * | 4/2011 |

(Continued)

OTHER PUBLICATIONS

International Search Report issued in International Application No. PCT/US2022/079267 dated Mar. 6, 2023.

*Primary Examiner* — Robert J Scruggs
(74) *Attorney, Agent, or Firm* — Vos-IP, LLC

(57) ABSTRACT

A surface marked threaded fastener comprising an elongated and threaded shaft and a head at one end of the elongated and threaded shaft; said head comprising on a surface contacting face a readable matrix comprising a dot pattern, said dot pattern defining a tightening specification.

12 Claims, 15 Drawing Sheets

(56) References Cited

U.S. PATENT DOCUMENTS

| | | | |
|---|---|---|---|
| 9,483,674 | B1 | 11/2016 | Fink et al. |
| 9,892,300 | B2 * | 2/2018 | Hosokane ........ G06K 19/06037 |
| 10,165,340 | B2 | 12/2018 | Tillotson et al. |
| 2004/0065154 | A1 | 4/2004 | Kibblewhite et al. |
| 2008/0178713 | A1 | 7/2008 | Long et al. |
| 2008/0319570 | A1 | 12/2008 | Van Schoiack et al. |
| 2010/0155380 | A1 | 6/2010 | Blackall et al. |
| 2013/0047408 | A1 | 2/2013 | Kibblewhite |
| 2017/0076191 | A1 * | 3/2017 | Feng ................ G06K 19/06037 |

FOREIGN PATENT DOCUMENTS

| | | | |
|---|---|---|---|
| CN | 111275152 | * | 6/2020 |
| DE | 3327964 | * | 2/1985 |
| DE | 3327964 A1 | | 2/1985 |
| DE | WO 00/63565 | * | 10/2000 |
| DE | WO 0063565 | * | 10/2000 |
| EP | 0422522 A1 | | 4/1991 |
| EP | 1038638 A1 | | 9/2000 |
| EP | 1060844 A2 | | 12/2000 |
| EP | 1188521 A2 | | 3/2002 |
| EP | 2399711 A1 | | 12/2011 |
| EP | 3483577 | * | 5/2019 |
| EP | 3483577 A1 | | 5/2019 |
| FR | 2930186 A1 | | 10/2009 |
| KR | 10-2020-0108448 A | | 9/2020 |
| TW | 201801860 A | | 1/2018 |
| WO | WO/1986/003314 A1 | | 6/1986 |
| WO | WO/2000/045997 A1 | | 8/2000 |
| WO | WO/2000/063565 A1 | | 10/2000 |
| WO | WO/2019/222855 A1 | | 11/2019 |
| WO | WO/2021/001214 A1 | | 7/2021 |

* cited by examiner

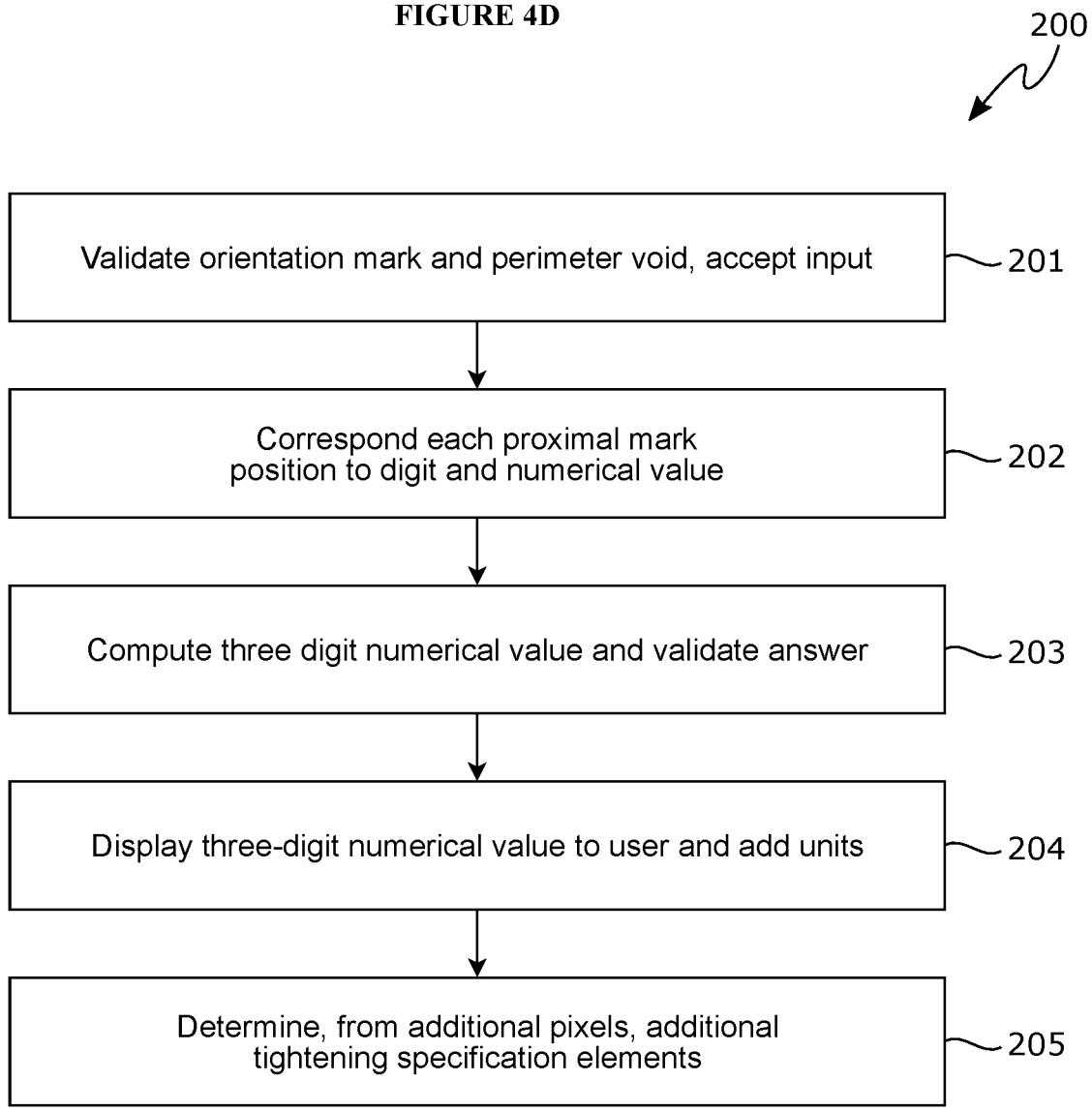

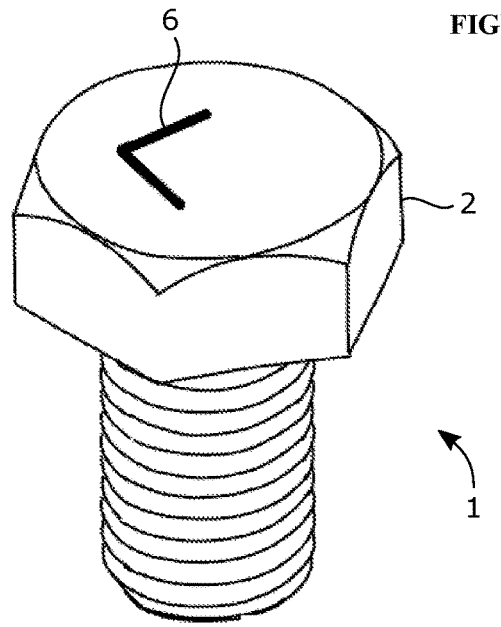
FIGURE 9E
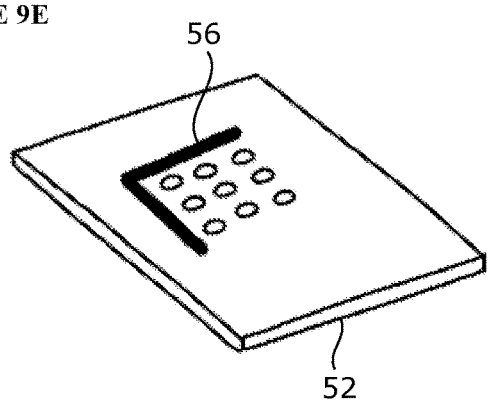
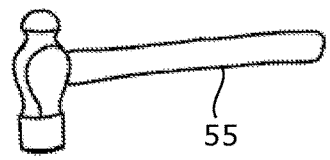
FIGURE 9G
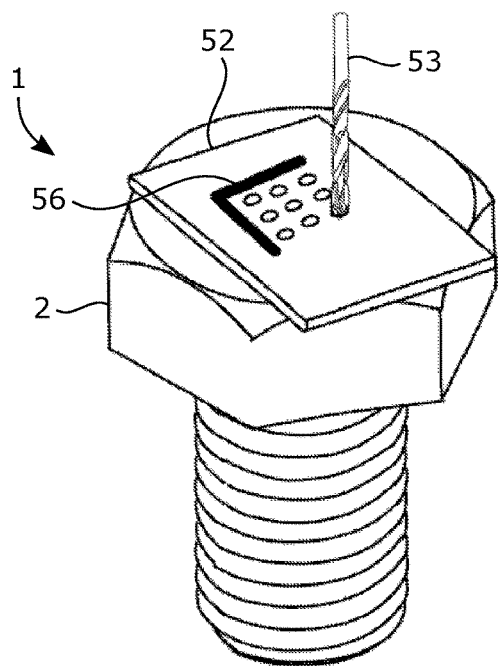
FIGURE 9F
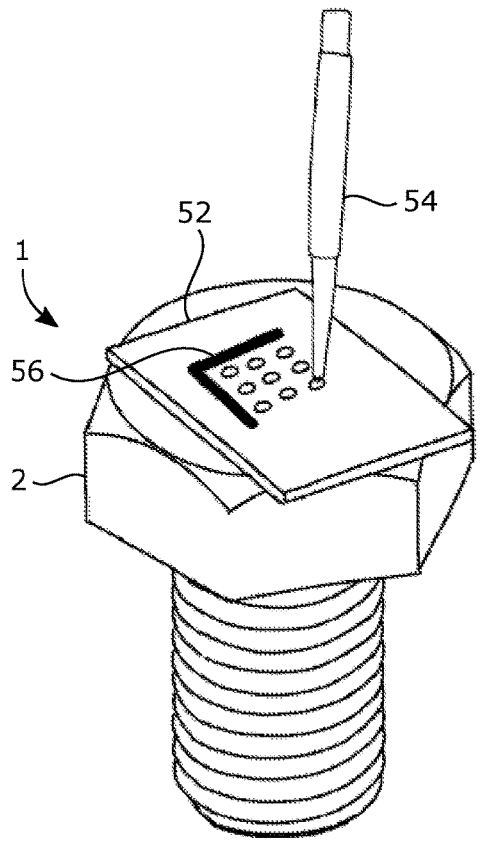

STORAGE, RECALL, AND USE OF TIGHTENING SPECIFICATIONS ON THREADED MECHANICAL FASTENERS

CROSS-REFERENCE TO RELATED APPLICATIONS

This application claims the benefit of U.S. Provisional Patent Application No. 63/263,543 filed on Nov. 4, 2021, and claims the benefit of U.S. Provisional Patent Application No. 63/265,552 filed on Dec. 16, 2021, with the United States Patent and Trademark Office, the contents of which are incorporated herein by reference in their entirety.

FIELD OF THE INVENTION

This invention is related to the enduring storage of tightening specifications on threaded mechanical fasteners, the recall of these specifications using scanners, cameras, and other readers, as well as various implementations to provide semi- and fully automated tool control.

BACKGROUND OF THE INVENTION

Threaded mechanical fasteners (e.g., bolts, screws, and their corresponding nuts, collectively "threaded fasteners") of various sizes are used to connect individual components in the manufacture of mechanical assemblages and are one of the most common standard mechanical hardware items utilized in worldwide manufacturing, maintenance, and repair. In some cases, the threaded fastener, such as a bolt, is inserted into a threaded hole within a mechanical assemblage. For example, a two-inch long bolt is screwed into a pretapped hole in a metal casting. In other instances, the threaded fastener lay be stationary, such as a threaded stud, and the corresponding nut may be fastened to the stationary threaded fastener. For example, a lug nut may be fastened to a stationary wheel stud that is affixed to a wheel hub to hold the wheel in place. In either case, assemblages often incorporate fasteners of various sizes, materials, and configurations.

In many manufacturing and assembly applications, a designer specifies threaded mechanical fastener properties (bolt geometry, material grade, thread classification, direction of thread, etc.) and threaded mechanical fastener tightening specifications (e.g., required torque [twisting] moment during tightening, angle of twist, presence and type of thread sealant or locker, single use torque-to-yield bolt, intermediate tightening steps/sequence, etc.). Tightening specifications can be unique for each individual threaded mechanical fastener or common to groups of fasteners (e.g., by size, by location, or by component).

Original equipment manufacturers (OEM) of mechanical assemblages typically note comprehensive tightening specifications for threaded mechanical fasteners on fabrication drawings for use during initial assembly (e.g., required torque [twisting] moment, direction of thread, presence and type of thread sealant or locker). For subsequent use during maintenance and repair, OEMs also compile and publish electronic or printed databases of required torque (twisting) moment but omit, other important threaded mechanical fastener tightening specification information.

Current databases published by original equipment manufacturers typically do not contain information relating to the direction of fastener rotation, the presence of factory installed thread locking compound, a warning that a fastener may require replacement after a single use, a warning that the fastener is part of a critical tightening sequence, or other information that is of substantial value during the disassembling and reassembling of a component during maintenance or repair. For instance, counter-threaded fasteners are often encountered by repair technicians in rotating assemblies where a conventionally threaded fastener may tend to loosen as a result of the rotation direction. If a repair technician mistakes a counterthreaded fastener for a conventionally threaded fastener, they are likely to damage or break the fastener by inadvertently tightening it rather than loosening it. Similarly, a threaded mechanical fastener that is initially installed with a permanent thread locking compound often cannot be loosened until the fastener is preheated to liquify the thread locking compound. Because the thread locking compound is not visible or known to a repair technician, substantial time and effort may be wasted trying to loosen a threaded mechanical fastener prior to realizing it requires preheating prior to loosening, Technicians also often encounter OEM fasteners specified for single use only—often called torque-to-yield bolts—in critical tension areas such as the attachment of diesel engine head to the engine block. In such cases, technicians reinstalling these fasteners after repair or maintenance often mistakenly reuse the prior fasteners rather than installed new replacement fasteners. Such incorrect reuse of torque-to-yield bolts poses significant quality control issues in engine assembly and other sensitive applications. Finally, technicians often encounter groupings of mechanically threaded fasteners that must be tightened in a prescribed sequence to ensure proper component contact pressure or clamping force. For instance, a cylinder head mating to an engine block may require multiple intermediate tightening steps and a specific alternating pattern. In such cases, databases referenced by repair technician may or may not alert the technician that a specific fastener is part of a manufacturer critical sequence and requires special attention during reassembly.

During component assembly, various tools exist to impose specified torque (twisting) moments to threaded mechanical fasteners and to monitor the magnitude thereof. Torque wrenches and other rotating tools commonly actuated using manual force, electric motors, pneumatics (compressed air), hydraulics (compressed fluids), or combinations thereof. Two major classifications of torque producing tools exist: (a) tools and assembly systems without the capability to monitor the magnitude of the applied torque moment and (b) tools and assembly, systems with the capability to monitor the magnitude of the applied torque moment. Examples of tools that can apply a torque moment but are unable to monitor the magnitude of the moment include hand wrenches, pneumatic drills and impact wrenches, electric drills and impact wrenches, and hydraulic drills and impact wrenches.

A torque producing tool that lacks the ability to monitor the magnitude of applied torque can be retrofitted with a torsional load cell or other force sensor to add the capability to monitor applied torque. While the tool generates the rotational (twisting) moment, the torsional force sensor monitors the output torque. The output from the torsional three sensor is also commonly used to automate torque-tool control. Such automation allows a user to input a minimum specified torque (twisting) moment and allows a tool to semi- or fully automatically perform a tightening operation until the specified torque moment is achieved. For semi- or fully automatic applications, control of the torque tool is typically achieved by precise modulation of the manual force applied, electrical supply to a motor, or pneumatic or hydraulic supply pressure. The simplest examples of a torque producing tool incorporating built-in capability to monitor the magnitude of applied torque is a manually operated torque wrench (e.g., click type torque wrench, beam style torque wrench, slip torque wrench) or electronic torque wrenches.

Common to most implementations of existing torque tools is the need for a user to manually query and input the minimum specified torque (twisting) moment for a particular fastener. Because technicians in the repair and maintenance sector nay encounter a wide variety of OEM products in their duties, the time and effort to retrieve and input appropriate minimum specified torque specifications for each fastener is nontrivial and often regarded as a nuisance.

Commonly available threaded mechanical fasteners (1) often contain embossed (protruding) symbols or markings on the flat surface of the fastener head (2) as shown in FIGS. 1A and 1B that denote limited information pertaining to fastener manufacture, most typically the manufacturer and bolt grade (material strength). Such markings are installed during manufacturing of the fastener. Common markings include series of lines (3) or groups of letters and/or numbers (4). Protruding markings on fastener heads are primarily relied on during initial fastener selection to ensure a particular design fastener material specification is satisfied. Protruding markings on threaded mechanical fasteners tend to accumulate dirt, grease, corrosion, and debris in industrial applications and become more difficult to decipher as they age.

Various methods exist or the storage of information in standard machine-readable codes including multidimensional bar codes, quick response (QR) codes, data matrix codes, and others. Such codes can be readily generated to correlate to a desired alphanumeric string (e.g., a Web site link, an inventory number, etc.). Available codes typically contain an orientation marking to identify the rotation of the marking and various means of redundant data storage within the marking to maximize readability, recoverability, and reducing reading errors. Generally speaking, the size of a generated code is proportional to the magnitude of data stored within the code. For instance, a three-digit number can be stored within a minimum 7 pixel by 7 pixel marking grid pattern of dots or cells within a commonly used ECC 200 Data Matrix protocol. As the number of dots, cells, or lines increase within a code, the code must be physically larger to preserve readability and maximum resolution. Machine readable codes are frequently printed directly on a component or printed on adhesive labels affixed to components. Existing standardized machine-readable codes are often implemented in precision-demanding applications such as manufacturing, food storage, or supply chain management where there exists a relatively high consequence of reading errors. To avoid such errors, significant code grid space and decoding logic is often devoted to ensuring readability and recoverability of damaged codes, which remains a critical problem based on the methods of making such codes. Because existing machine-readable storage code are generic and not optimized to a particular application or industry, they may not offer the most optimized solution for a particular application without the need for redundancy in storage.

Prior attempts to store, recall, and use various subsets of threaded mechanical fastener tightening specifications on a fastener head possess numerous weaknesses ng but not limited to such specifications being incomplete, having a limited service life, nonuniversal, requires complex redundancy, and is wholesale impracticable for use with threaded fasteners.

Applicant has created an elegant solution that provides complete information within a simple form factor, one that can be machine read or read by a person, can be economically mass produced, does not suffer from service life issues, becomes more pronounced from increased contrast in typical implementations, and is scalable from small to larger form factors. Thus, Applicant has created a novel and elegant solution that provides for the enduring storage, recall, and use of tightening specifications on threaded mechanical fasteners.

SUMMARY OF THE INVENTION

The embodiments herein detail the hardware and software subcomponents of a system that provide for the enduring storage and recall of tightening specifications on threaded mechanical fasteners and methods of use in various applications thereof. Tightening specifications stored within this system may include any relevant parameters to the tightening of a threaded mechanical fastener. For instance, tightening specifications for a particular threaded fastener may include but are not limited to the minimum required torque (rotation) moment on a fastener, a specified angle of twist, the direction of the thread, or an indicator of the presence of lubricants, the presence of thread locking compound, a single use fastener, or of fastener importance, and combinations thereof.

Storage of unique tightening specifications for each individual bolt is achieved by minimally altering the largest flat surface of a common threaded fastener (typically the bolt top) to install a particular debossed (inset) pattern in one or more steps. However, certain embodiments allow for the debossed pattern to be placed on another surface. The storage patterns utilized within this system are uniquely optimized to fit on flat surfaces of threaded mechanical fasteners and provide for low installation cost, a minimum number of markings, scalability to different fastener sizes, highly detectable contrast, intrinsic recoverability, life cycle durability in dirty environments, and standardization opportunities. These unique patterns are designed for both efficient machine-readability and simple manual decoding by a technician using basic algebra.

Recall of information passively stored on a threaded fastener is achieved throughout the service life of the fastener by two means: (1) a technician can manually decode stored information according to a prescribed spatial and arithmetic algorithm, or (2) a stationary or mobile computer system can electronically scan, decode, and display or use the stored fastener tightening specification. The capability to electronically decode previously stored fastener tightening specifications can be provided in standalone single purpose handheld scanners or incorporated into other universally available smart phones, tablets, microcomputers, or other computer processors.

In a preferred embodiment of the proposed system, the aforementioned capabilities are implemented within an existing torque tool that already has the capability to monitor and modulate applied torque during fastener tightening or loosening. An optical scanner, incorporated within the tool body, provides input to an onboard microprocessor capable of decoding the stored fastener tightening information and directing control of the tool accordingly. For instance, a technician reinstalling a threaded fastener during maintenance may use their torque tool to optically scan a fastener pattern to automatically configure their tool to the proper rotation direction, minimum required torque (rotation) moment, and to alert the technician to any special requirements for the particular application or trigger an automatic prompt to reorder a nonreusable fastener.

In a preferred embodiment of the proposed system, the aforementioned capabilities are implemented within an existing automated or semiautomated manufacturing or assembly process. By storing information directly on threaded mechanical fastener heads prior to assembly, the work of assemblers (robotic or human) can be decentralized from an assembly control system and offer increased flexibility during manufacturing. For instance, an assembly line activity can be directed by the mechanical fasteners provided to an assembly station or robot rather than being user selected or directed by a centralized assembly control system.

In a preferred embodiment, a surface marked threaded fastener comprising an elongated and threaded shaft and a head at one end of the elongated and threaded shaft; said head comprising on a surface contacting face a readable matrix comprising a dot pattern, said dot pattern defining a tightening specification.

In a further embodiment, the surface marked threaded fastener wherein the readable matrix comprises between 6 dots and 24 dots within the dot pattern.

In a further embodiment, the surface marked threaded fastener wherein the dot pattern is embossed, debossed, or a combination thereof.

In a further embodiment, the surface marked threaded fastener further comprising an orienting mark. In a further embodiment, the surface marked threaded fastener wherein said orienting mark is positioned along at least a portion of a length of one side of the readable matrix. In a further embodiment, the surface marked threaded fastener wherein the orienting mark is positioned along at least a portion of two sides of the readable matrix.

In a further embodiment, the surface marked threaded fastener wherein the orienting mark further describes at least one tightening specification. In a further embodiment, the surface marked threaded fastener wherein the tightening specification comprises a unit of measurement.

In a further embodiment, the surface marked threaded fastener wherein the orienting mark comprises a vertical segment and a horizontal segment, said vertical segment and horizontal segment being connected at a vertex adjacent to a corner of the readable matrix. In a further embodiment, the surface marked threaded fastener wherein the vertical segment and the horizontal segment are linear or nonlinear segments.

In a further embodiment, the surface marked threaded fastener wherein the readable matrix comprises at least three rows and three columns.

In a further embodiment, the surface marked threaded fastener wherein the readable matrix is formed of debossed markings.

In a further embodiment, the surface marked threaded fastener wherein the readable matrix is a three-dimensional matrix comprising at least one recessed pixel within the readable matrix.

In a further embodiment, the surface marked threaded fastener wherein the readable matrix comprises a ratio of pixel diameter to interpixel spacing of between 10:1 and 1:10. In a further embodiment, the surface marked threaded fastener wherein the ratio of pixel diameter to interpixel spacing is 2:1. In a further embodiment, the surface marked threaded fastener further comprising an orienting mark of between 1 pixel diameter and 0.1 pixel diameter.

In a further embodiment, the surface marked threaded fastener wherein the tightening specification is selected from the group consisting of: minimum required torque moment on a fastener, a specified angle of twist, a direction of the thread, an indicator of presence of lubricants, presence of thread locking compound, a single use fastener, fastener importance, units of force, and combinations thereof.

In a preferred embodiment, a surface marked threaded fastener comprising a female threaded opening centrally disposed within a head; said head comprising on a surface contacting face a pixel pattern, said pixel pattern comprising a readable matrix comprising a dot pattern of between 6 dot positions and 24 dot positions defining a tightening specification.

In a further embodiment, the surface marked threaded fastener wherein the readable matrix is sized in proportion to the size of the head.

In a preferred embodiment, a system for marking a necessary torque setting comprising: disposing on or adjacent to an opening for receiving a threaded fastener a pixel pattern, said pixel pattern comprising a readable matrix comprising a dot pattern of between 6 dot positions and 24 dot positions, said dot pattern defining a tightening specification.

In a preferred embodiment, a kit for defining a dot pattern within a readable matrix defining a tightening specification comprising: a head stencil for marking a matrix onto a threaded fastener, said head stencil comprising a receiving portion, said receiving portion defined for being received on a head of a threaded fastener; a matrix pattern within said head stencil comprising a plurality of openings, said openings displaying a portion of the head, the plurality of openings capable of receiving a marking element; and said marking element suitable for marking a matrix pattern into the head of said threaded fastener.

In a further embodiment, the kit wherein the head stencil comprises an orienting component capable of being marked with said head stencil. In a further embodiment, the kit wherein the orienting component comprises a punch element; said punch element sufficient to be struck with a force sufficient to mark the orienting component on said head; wherein the force secures the head stencil into place sufficient for marking said matrix pattern into said head. In a further embodiment, the kit wherein the orienting component is a template indexing mark, said template indexing mark being concave or convex to receive a corresponding indexing mark.

In a preferred embodiment, a kit for embossing a readable matrix into a threaded fastener comprising: a stencil, said stencil comprising a length and a width, and a template indexing mark being convex and defined to be received within a recess on a threaded fastener; and said stencil further comprising a matrix of openings for receiving within said openings a material suitable for marking a pixel within the readable matrix.

In a preferred embodiment, a system for detecting and applying a tightening specification to a threaded fastener comprising: (a) detecting on a threaded fastener a dot pattern identifying the tightening specification; (b) modifying a component of a tool to a torque specification defined in the tightening specification; and (c) applying the torque specification to the threaded fastener.

In a further embodiment, the system wherein the tool is an electronic torque wrench, a hydraulically controlled torque wrench, or a pneumatically controlled torque wrench.

In a further embodiment, the system wherein the tightening specification comprises at least one further element selected from the group consisting of: a specified angle of twist, a direction of the thread, an indicator of presence of lubricants, an indicator of presence of thread locking compound, an indicator of a single use fastener, an indicator of fastener importance, and combinations thereof.

In a further embodiment, the system wherein a camera detects the dot pattern and a microcontroller modifies the tool to the torque specification.

In a further embodiment, the system wherein upon application of the torque specification to the threaded fastener, the torque specification applied to said threaded fastener is stored in a database.

In a further embodiment, the system wherein the tool further comprises: a brush to remove dirt, grease, and other contaminants from a fastener head to expose tightening specification markings; grinding or sanding attachments to recover damaged tightening specification markings; a light to optically capture of the tightening specification markings; electromechanical switching of drive direction to facilitate automatic torque tool direction control; automated dispensers for thread sealant incorporated directly into tool heads; and integrated automatic fastener preheating assemblies to assist in loosing fasteners previously installed with thread sealant.

In a further embodiment, the system wherein upon receiving the tightening specification, a threaded fastener is reordered when the tightening specification defines that the threaded fastener is a single use material.

In a preferred embodiment, a method for automated installation of a debossed dot pattern by peening, machining, or punching comprising: (a) defining a required tightening specification; (b) determining a required orientation within the debossed dot pattern; and (c) applying with a tool the required debossed dot pattern to define the tightening specification.

In a preferred embodiment, a method of optical decoding of a debossed pattern using a smartphone, tablet, or another independent scanner comprising: (a) detecting an orienting mark; (b) determining a value of a first integer of a rotational torque; and (c) determining a value of a second integer of the rotational torque.

In a further embodiment, the method wherein the first integer is a hundreds unit and the second integer is a tens unit. In a further embodiment, the method further comprising determining a value of a third integer of the rotational torque, wherein said third integer is a ones unit.

In a further embodiment, the method further comprising determining a unit of measurement for the rotational torque.

In a further embodiment, the method wherein the debossed pattern further defines at least one further element.

In a further embodiment, the method wherein the debossed pattern is a readable matrix comprising a dot pattern of between 6 dots and 24 dots.

In a preferred embodiment, a method of decoding of a debossed pattern defining a tightening specification using an optical scanner incorporated into a torque tool comprising: (a) detecting the debossed pattern with the optical scanner, said debossed pattern comprising a dot pattern in a readable matrix; (b) determining from said debossed pattern an orienting mark; and (c) reading the tightening specification based on orienting the debossed pattern from the orienting mark.

In a preferred embodiment, a torque tool comprising an optical scanner and a microprocessor, said microprocessor orienting an image captured by the optical scanner based on an orienting mark and determining a tightening specification based on a dot pattern within a readable matrix; wherein the torque tool, via the microprocessor, modifies a minimum torque setting for application of the minimum torque setting to a threaded fastener.

In a preferred embodiment, a kit for modifying a torque tool comprising an optical scanner and a microprocessor, said optical scanner and said microprocessor suitable for reading a dot pattern defined within a readable matrix on a threaded fastener, and wherein said microprocessor modifies at least a minimum rotational torque applicable by said torque tool.

In a further embodiment, the kit wherein upon determining the minimum rotational torque, said minimum rotational torque is applied via said torque tool.

In a further embodiment, the kit wherein the microprocessor is in communication with a torque load cell and/or other torque sensor for semiautomated and fully automated control of said torque tool.

In a preferred embodiment, a torque application tool comprising: an optical sensor, a microprocessor, and at least one of a brush, a compressed air dispenser, or a solvent dispenser; and an automated thread locker dispenser.

In a further embodiment, the torque application tool further comprising a further element on said torque application tool selected from the group consisting of: brushes to remove contaminants from a fastener head to expose tightening specification markings, grinding or sanding attachments to recover damaged tightening specification markings, specialty photography lights to assist in optical capture of tightening specification markings, surface treatments to assist in optical capture of tightening specification markings, electromechanical switching of drive direction to facilitate automatic torque tool direction control, automated dispensers for thread sealant incorporated directly into tool heads, integrated automatic fastener preheating assemblies to assist in loosing fasteners previously installed with thread sealant, and combinations thereof.

In a preferred embodiment, a torque wrench comprising: a handle attached to a heat said head comprising a torque limiting assembly comprising a drive square mechanically connected thereto; said torque wrench comprising a sensing element for detecting a machine-readable dot pattern on a socket; and wherein the sensing element is in electronic communication with a microcontroller, said microcontroller configuring a torque based upon information provided by information on the machine-readable dot pattern, wherein the microcontroller generates a torque setting to set a predetermined torsional output with the torque limiting assembly.

In a further embodiment, the torque wrench wherein the torque limiting assembly is a transducer, a strain gauge, a rotational sensor, a pressure regulator, or a pressure pump.

In a further embodiment, the torque wrench wherein the machine-readable dot pattern defines a tightening specification comprising data selected from the group consisting of: bolt manufacturer, bolt strength/composition, bolt geometry, torque specification, presence of thread sealant, presence of lubricant, an indication of whether bolt can be reused, angle of twist specification, and combinations thereof.

In a further embodiment, the torque wrench wherein said sensing element is positioned on the drive square.

In a further embodiment, the torque wrench wherein torque is applied via a hydraulically, pneumatically, or electrically powered rotation. In a further embodiment, the torque wrench further comprising a regulator.

In a preferred embodiment, a torque wrench comprising: (a) a handle attached to a head; (b) said head comprising a torque limiting assembly for rotating a socket attached to a gear assembly; (c) said socket comprising a plurality of slideable members, said slideable members slideable by rotation of a rotating member and capable of adjusting around a head inserted therein; and (d) wherein a microcontroller determines a predetermined torsional output by detecting a dot pattern in a readable matrix and applies said predetermined torsional output through said torque limiting assembly.

In a preferred embodiment, a torque wrench comprising: (a) a handle attached to a head; (b) said head comprising a torque limiting assembly comprising a drive square mechanically, connected thereto; (c) said torque wrench comprising a sensing element for detecting a dot pattern within a readable matrix on a proximate element; and (d) wherein the sensing element is in electronic communication with a microcontroller, said microcontroller configuring a torque based upon information provided by information on the dot pattern, wherein the microcontroller generates a torque setting to set a predetermined torsional output with the torque limiting assembly.

In a further embodiment, the torque wrench wherein the proximate dement is selected from the group consisting of: a socket, a nut, and a bolt.

In a preferred embodiment, a torque wrench comprising: (a) a handle attached to a head; (b) said head comprising a torque limiting assembly comprising a drive square mechanically connected thereto; (c) said torque wrench comprising a sensing element for detecting a dot pattern in a readable matrix on a socket; (d) wherein the sensing element is in electronic communication with a microcontroller, said microcontroller configuring a torque based upon information provided by information on the dot pattern, wherein the dot pattern generates a torsional output; and (e) wherein said microcontroller generates a torque setting to set a predetermined torsional output with the torque limiting assembly.

BRIEF DESCRIPTION OF THE FIGURES

FIG. 4D depicts a flowchart exemplifying a decoding algorithm for a 3 pixel by 3 pixel tightening specification pattern capable of storing three-digit numbers within the range of 0-199

FIG. 7C depicts hydraulically actuated electronic torque tool with integrated scanning element, and FIG. 7D depicts a pneumatically actuated electronic torque tool with an integrated scanning element.

FIGS. 9A-9G depict marking elements for automatically or manually imparting certain fastener specifications into the fastener of the present embodiments.

DETAILED DESCRIPTION OF THE INVENTION

Figure 1A:
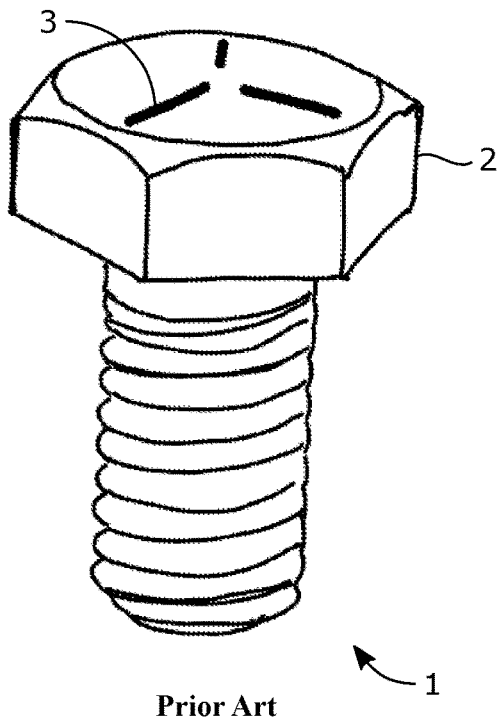
FIGS. 1A and 1B detail prior art bolts.
Figure 1B:
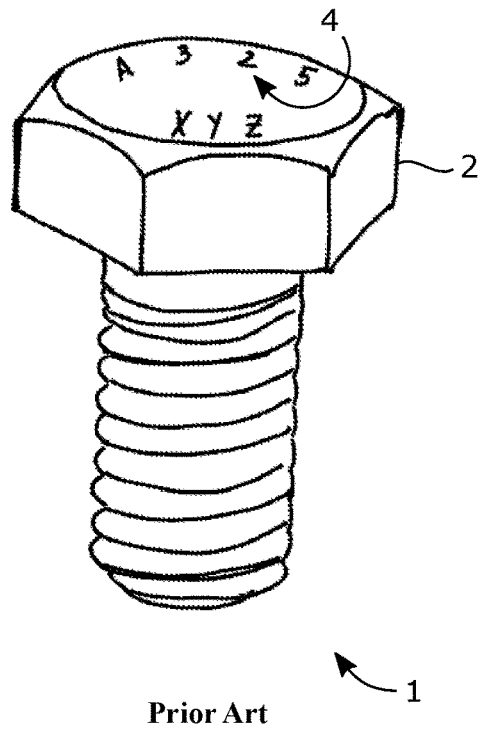

Various embodiments are described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, devices, or any similar or equivalent arrangements known to those skilled in the art. Accordingly, the various embodiments may take the form of an entirely hardware embodiment, an entirely software embodiment or an embodiment combining software and hardware aspects. The following detailed description is, therefore, not to be taken in a limiting sense.

As used in this application, the words "a," "an," and "one" are defined to include one or more of the referenced items unless specifically stated otherwise. The terms "approximately" and "about" are defined to mean±10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

The embodiments herein detail marking systems, fasteners comprising unique markings, devices for applying markings, algorithms for decoding markings, devices for detecting unique fastener markings, and devices that detect unique markings and then semi- or automatically set a torque for securing a fastener. In certain embodiments, robotics or automated systems can detect the markings of the present embodiments and secure the fastener autonomously, providing significant efficiency gains over prior art systems.

Fasteners are frequently required to connect two or more components together. In many cases, threaded fasteners, e.g., a bolt and a nut are utilized to make this connection. In many cases, the particular amount of rotational force, or torque, applied when connecting the nut to the bolt has a specific minimum requirement in order to properly make a secure attachment. However, this is not the only element that may be relevant to securing or removing a threaded fastener.

Tightening specifications include any relevant parameters to the tightening or loosening of a threaded mechanical fastener. Tightening specifications for a particular threaded fastener may include the minimum required torque (rotation) moment on a fastener, a specified angle of twist, the direction of the thread, and various indications to the presence of lubricants, thread locking compounds, single use fasteners, or of fastener importance. To ensure proper tightening, loosening, and retightening of threaded mechanical fasteners, it is critical that the tightening specifications for a particular threaded mechanical fastener are preserved and readily available for assembly, maintenance, and repair throughout the service life of the assemblage.

Figure 2A:
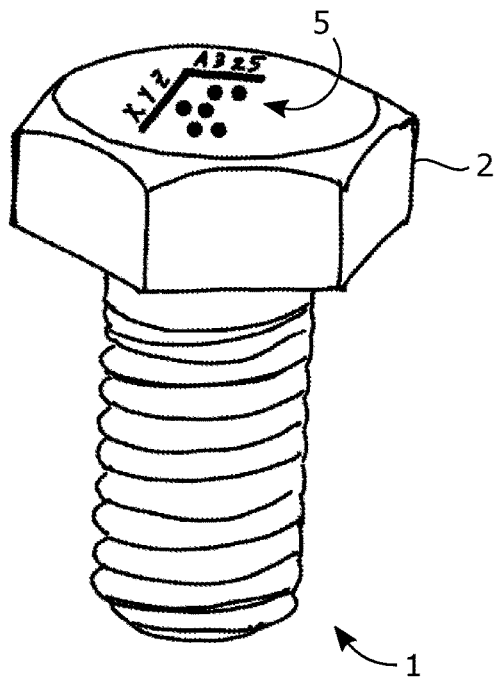
FIGS. 2A and 2B detail an isometric and plan view of a bolt marking according to presently described embodiments, with FIG. 2A depicting an isometric view of the longitudinal axis and FIG. 2B depicting a plan view down the longitudinal axis wherein a portion of the dot pattern grid is positioned over the center point along the longitudinal axis of the head of the bolt.
Figure 2B:
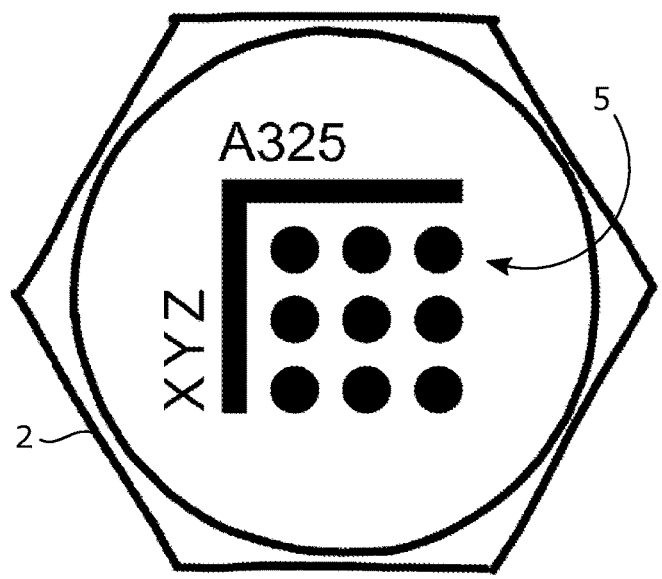

In the embodiment shown in FIGS. 2A and 2B, a fastener information and tightening specification marking dot pattern (5) is located on the head (2) of a threaded mechanical fastener (1) to provide for the perpetual storage and recall of the fastener's tightening specification. The fastener information and tightening specification marking dot pattern (5) consists of a series of universal permanent markings that identify one or more critical parameters that comprise the threaded mechanical fastener's tightening specification, provide information on the manufacturer and/or bolt grade, or assist with decoding of the marking pattern. Markings may be a debossed, flush, or embossed on the fastener head, or any combination thereof.

Debossed markings offer distinct advantages to the readability of the stored tightening specifications. Because threaded mechanical fasteners tend to be utilized in close proximity to moving mechanical components, accumulation of grease, grime, dirt, and other industrial contaminants is unavoidable. When these accumulated contaminants are cleaned or brushed off of the flat surface of a fastener head, they are removed fully from flat surfaces but remain within the discrete debossed markings. Because industrial contaminants tend to be dark in color, the presence of the remaining contaminants within debossed markings serve to increase the contrast of the pattern and, therefore, increase the readability of a debossed marking pattern.

Debossed markings also offer district advantages to the robustness and flexibility of stored tightening specifications. When deliberately applied to the head of a threaded mechanical fastener, a coating of grease helps to protect the debossed pattern until it is wiped clean for reading. In addition, because readability of debossed patterns is improved through accumulation of industrial contaminants within markings for reading, the precise depth of the marking below the flat surface need not be closely controlled. As long as the depth is sufficient to encourage the enduring accumulation of dirt, grease, and grime despite wiping of the flat surface, the debossing depths of adjacent markings need not be consistent.

Debossed markings also offer distinct advantages to the resiliency and recoverability of stored information on the flat surface of threaded mechanical fasteners. If a debossed marking pattern becomes damaged by impact, corrosion, or other physical damage and is rendered unreadable, it can be recovered by abrasive grinding of the flat bolt surface. By removing a thin layer of damaged material, the debossed marking pattern can be renewed and once again be readable after damage, a process which is not possible with embossed markings. The intrinsic recoverability of debossed marking patterns offers a distinct advantage as compared to other existing marking patterns because pattern size can be minimized by omitting the internal redundancy integrated into existing QR and data matrix marking patterns. For instance, a data matrix marking pattern might require a minimum of a 7 pixel by 7 pixel marking to store a three-digit number to ensure enduring readability if a portion of the marking pattern is damaged. When that 7 pixel by 7 pixel marking pattern is appropriately scaled to fit on a relatively small flat fastener head, each pixel is small and requires specialized equipment or readers to discern the meaning of the marking pattern. If the same information is stored without redundancy within a 3 pixel by 3 pixel pattern, the size of each pixel on a fastener head is comparatively larger. Larger pixel sizes correlate to increased resolution, meaning marking patterns can be more clearly read and deciphered at increased viewing distances and angles. Furthermore, larger pixel sizes reduce the risk of destruction of much smaller pixel sizes, which thus require redundancy to ensure readability. Thus, by use of a three-dimensional system, with embossed (concave) recesses, stability and resolution are increased.

Figure 3A:
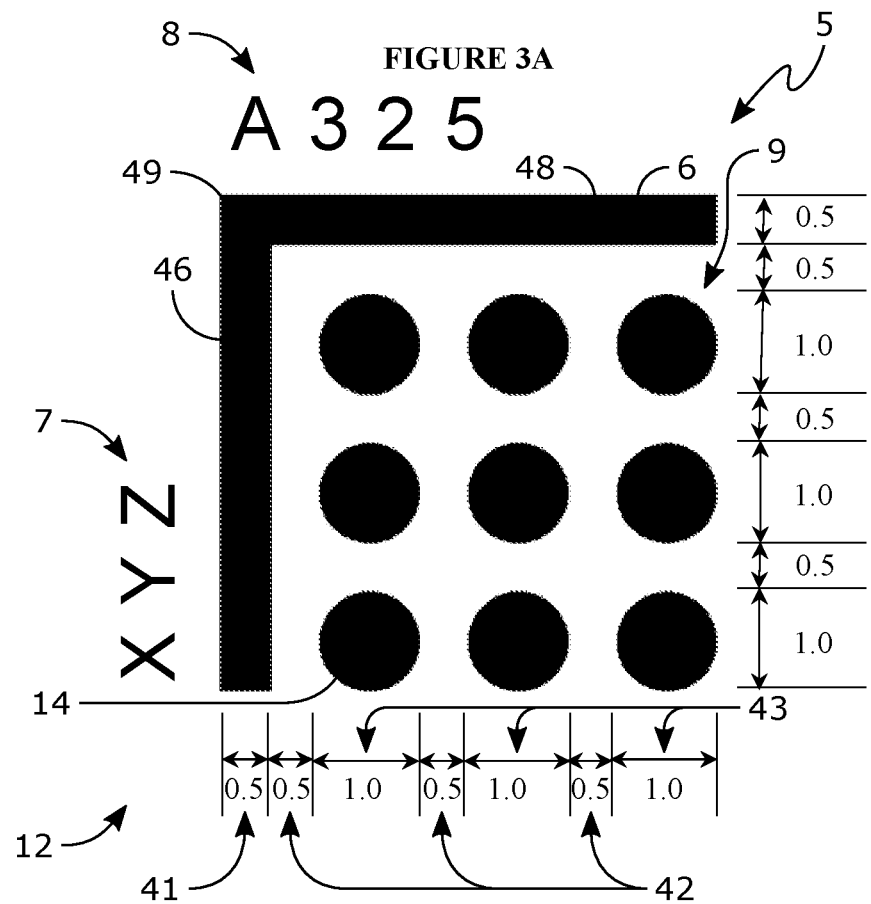
FIGS. 3A-3C detail different marking orientations to convey certain information regarding a fastener specification according to the present embodiments, with FIG. 3A showing a 3×3 grid, FIG. 3B showing a 3×4 grid, and FIG. 3C showing a 4×4 grid.
Figure 3B:
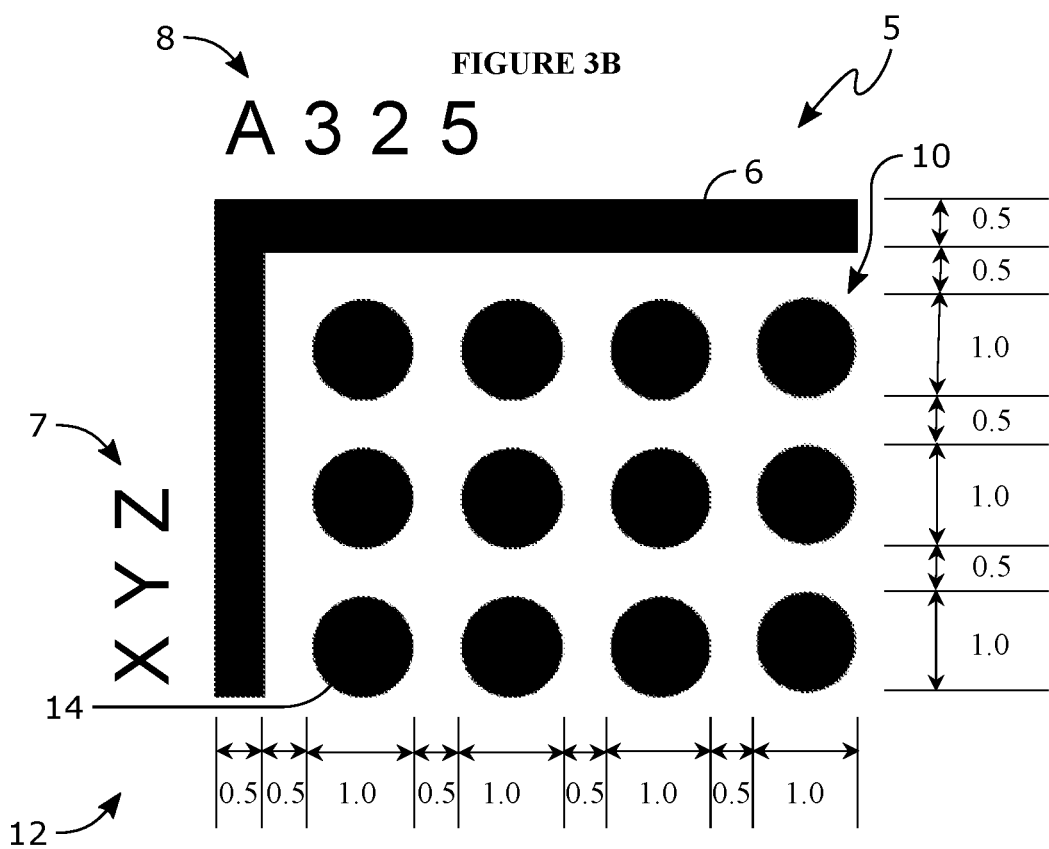
Figure 3C:
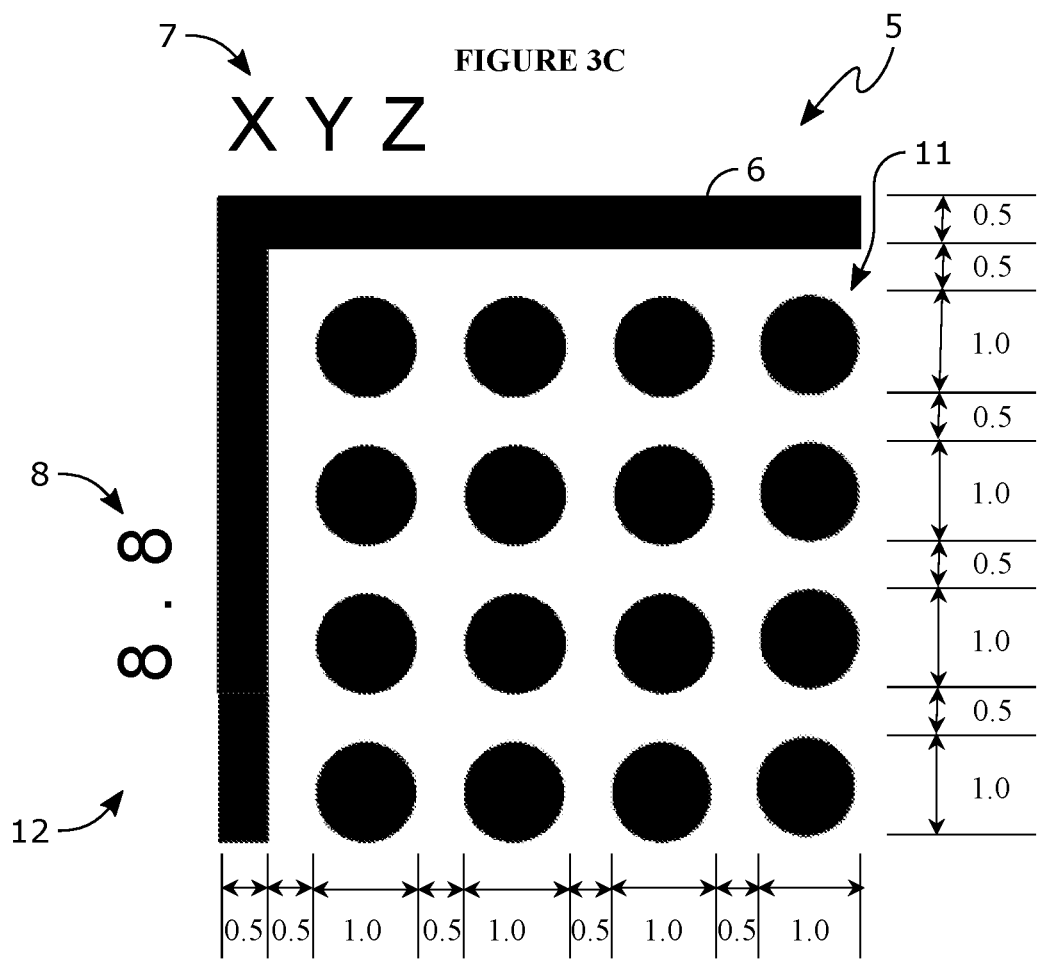

In the nonlimiting embodiments shown in FIGS. 3A-3C, the fastener information and tightening specification marking dot pattern (5) consists of an indexing mark (6), fastener manufacturer information (7), fastener grade information (8), and a readable matrix pattern of pixels defined in a 3×3 grid (9), which is positioned in the vicinity of an otherwise void space (12) on the fastener head. The tightening specification marking dot pattern (5) comprises one or more pixels (14) within the tightening specification marking dot pattern (5). Examples are shown of various arrangements and data storage capabilities of fastener information and tightening specification marking dot patterns (5). For instance, FIG. 3A demonstrates a 3 pixel by 3 pixel tightening specification marking pattern (9) consisting of 9 total pixels, FIG. 3B demonstrates a 3 pixel by 4 pixel tightening specification marking pattern (10) consisting of 12 total pixels, and FIG. 3C demonstrates a 4 pixel by 4 pixel tightening specification marking pattern (11) consisting of 16 total pixels (14). These sizes are optimized for the necessary and limited data for conveying a tightening specification marking pattern comprised of the several pixels (dots) with the pattern.

Indexing marks shown are nonlimiting, but generally serve the purpose of defining the orientation (top) of a pattern and identifying the available pixel locations within a tightening specification marking dot pattern (5). Indeed, indexing marks (6) are depicted as two short line segments, a vertical line segment (46) and a horizontal line segment (48), being attached at one vertex (49). Each one of the line segments may be a straight, wavy, jagged mark, so long as it provides for the appropriate orienting of the tightening specification marking dot pattern (5). Thus, the line segments may be broken line segments, other shapes or letters, or another identifiable marking to orient a top, and thus identifying a left and right, where appropriate to orient the tightening specification marking dot pattern (5).

The relative spacing of various components and pixels comprising a fastener information and tightening specification marking dot pattern (5) are related to the resolution (readability) and absolute size of marking patterns. Maximizing pixel size and spacing between pixels helps to increase resolution but corresponds to increased absolute pattern size. In the application of storing information on a threaded mechanical fastener, a limited amount of flat space is available on the fastener head. An optimized nonlimiting geometric ratio for fastener information and tightening specification marking patterns is shown in FIGS. 3A-3C. Thus, a line weight (41) of the indexing mark is approximately or about the same as the interpixel space (42). Notably, then the pixel (14) has a pixel size (43). The ratio shown provides a space between pixels (14) and the interpixel space (42) equal to half (0.5) of the pixel (14) marking diameter (1.0). Although a 0.5 (interpixel space) (42) to 1.0 (pixel size) (43) ratio is demonstrated in FIGS. 3A-3C, other ratios may be used as necessary to maximize viewing resolution and ensure appropriate fit on a threaded mechanical fastener head. Preferably, the range is between 0.1:1.0 space-to-pixel and 1.0:0.1 space-to-pixel. Preferably, however, the pixel (14) is greater than or equal to the interpixel space (42) in order to optimize size on the head of a fastener.

The nonlimiting geometric ratio of 0.5 (space) to 1.0 (pixel) demonstrated in FIGS. 3A-3C may be scaled to achieve any target size footprint for a fastener information and tightening specification marking dot pattern (5). By preserving the ratio of the pattern despite different size footprints, the pattern can remain standard despite different footprint sizes. A convenient nonlimiting fastener information and tightening specification marking dot pattern (5) size is achieved by constraining the pixel size to a common metal tooling diameter. For example, in an embodiment wherein pixel diameter is constrained to 1/16 inch and the rest of the pattern is defined by the relative spacing ratio of 1.0:0.5, the spacing will be 1/32 inch. Manufacturer information (7) and fastener grade information (8) need not necessarily be constrained to the same pixel dimension but are also shown at the same pixel size for the text height in the nonlimiting examples. Furthermore, manufacturer information (7) and/or fastener grade information (8) need not be included as a marking or can be marked in a different manner than the pixels (14) within the tightening specification marking dot pattern (5). Thus, the pixels (14) may be debossed, whereas the manufacturer information (7) and/or fastener grade information (8) may be embossed. As shown in FIG. 3A, a 3 pixel by 3 pixel tightening specification marking pattern (9) defined by a 1.0 pixel size (here, 1/16 inch) results in a minimum footprint (omitting fastener grade [8] and manufacturer information [7]) of 5/16 in. by 5/16 in. This minimum footprint readily fits on the head of the majority of standard available threaded mechanical fasteners including all those exceeding 3/16 in. nominal thread diameter. Where more space is available on the head of a threaded mechanical fastener, additional information can be stored by adding rows or columns to the tightening specification markings such as those shown in FIGS. 3B and 3C. Despite the additional pixels included in these marking patterns, if pixel size is constrained to 1/16 in., the footprint of these patterns remains appropriate for standard available threaded mechanical fasteners with a nominal thread diameter of 1/4 in. or larger.

Figure 4A:
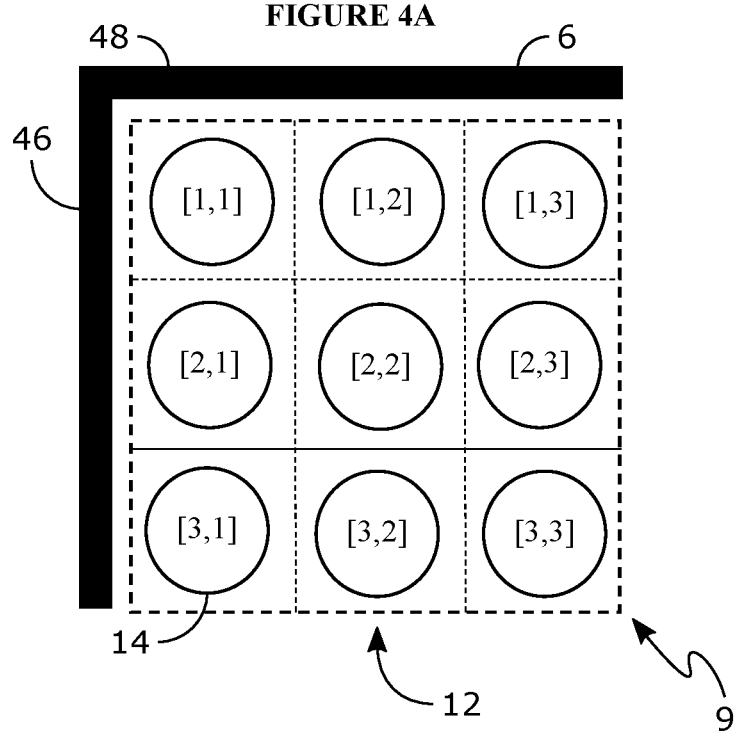
FIGS. 4A-4C detail different examples related to an algorithm comprising certain marking orientations of the present embodiments.
Figure 4B:
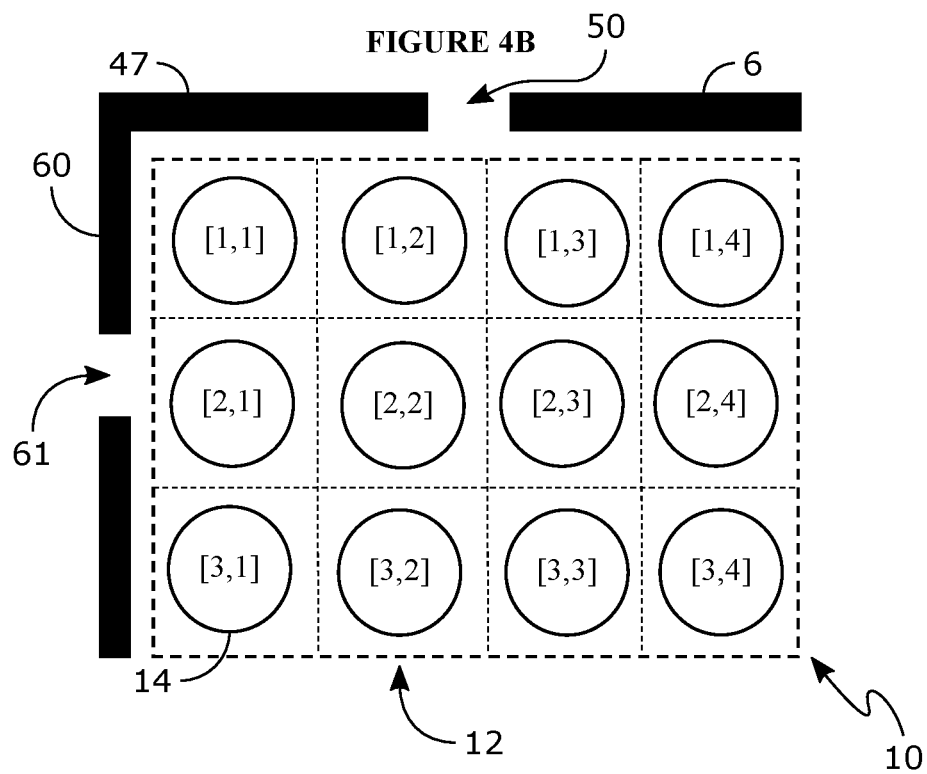

Storage and recall of information within tightening specification markings is achieved using standard definitions corresponding to the presence or absence of each pixel (14) and basic algebra. Tightening specification markings are intended to be both machine-readable and manually decodable by a technician. Within the readable matrix of the dot pattern, the presence or absence of a pixel (14) corresponds to either a digit or tightening specification attribute. For instance, the presence of a pixel (14) marking in the upper left pixel location (denoted by [1,1]) within the 3 pixel by 3 pixel tightening specification pattern (9) shown in FIG. 4A may correspond to a digit used to store target minimum torque specifications, while the presence of a pixel marking in another location may alert to a particular tightening specification attribute (e.g., presence of a mark indicates a left hand thread fastener). Various examples of 3×3, 4×3, and 4×4 patterns are detailed in FIGS. 4A, 4B, and 4C, with corresponding examples in FIGS. 5A, 5B, and 5C. FIG. 4B further details an alternate embodiment of a horizontal line segment (47) featuring a broken section (50) and a vertical line segment (60) featuring a broken section (61), which may be used to indicate, for example, a different unit of measurement than that indicated by marking patterns utilizing the unbroken horizontal line segment (48) and unbroken vertical line segment (46). For instance, an indexing mark (6) consisting of two unbroken horizontal line segments joined at a vertex (49) may indicate a three-digit torque specification is presented in metric units (e.g., newton-meters), while a broken horizontal line segment (47) comprising a broken section (50) may indicate a specification presented in imperial units (e.g., foot-pounds). In such a manner, the indexing mark may convey units or another feature of the tightening specification. Furthermore, the horizontal (top) line segment (47) when broken (50) may indicate one specification and the vertical line segment (60) when broken (61) may indicate a second specification. This allows for even a 3×3 grid (9) to convey additional information.

Steps represented within the sample algorithms are for demonstration and may be combined in any useful permutation.

A nonlimiting decoding algorithm for a 3 pixel by 3 pixel tightening specification pattern (9) capable of storing three-digit numbers within the range of 0-199 is exemplified by the flowchart (200) of FIG. 4D. Although illustrated using logic programming, the algorithm is intuitive and can be manually applied quite easily once understood, but it is also optimized for decoding by computer programming.

Step (201) validates the orientation mark and perimeter void, which accepts the input. Meaning, using the orientation mark (6) the specific marking dot pattern (5) can then be determined. At step (202), using a 3×3 grid, determine if there is a hundreds unit: if the mark is positioned at [2,2] then the digit is a 1; if there is no pixel at [2,2], it is a 0.

Now for the tens digit, this is determined where the first digit [1,1] has a value of 1, the second digit [1,2] has a value of 2, the third digit [1,3] has a value of 3, and the fourth digit [2,3] has a value of 4. Similarly, the ones digit is determined by a similar 1, 2, 3, 4 value from [3,3], [3,2], [3,1], and [2,1]. In each case, a zero number in that space (except for the 100s digit) uses all four pixels. Thus, each L-shaped digit determination must have at least one mark, or there is determined an error.

At step (203), once the pixels are determined, sum the numbers to create the hundreds, tens, and ones digits.

Step (204) displays the numerical value, either to the user, or provide the same to a microcontroller within a semi- or automatic device to set a torque setting.

Step (205) applies only to 3×4 or larger arrangements, which determines at [1,4] if a bolt is reusable, at [2,4] the presence of a thread locker, and at [3,4] whether the fastener is part of a required sequence.

A 4×4 grid, may utilize a different plan, namely [1,1], [1,2], [1,3], and [1,4], define a linear arrangement for a digit of the torque value. This allows for greater torque values to be determined. Thus, in order, from left to right, are the values 1, 2, 3, and 4 for each of the hundreds, tens, and ones places, with the bottom row corresponding similar elements from step (205) above.

Such steps for a 3×3 marking pattern within FIG. 4D may be further described as follows:

STEP (201) accomplishes identification of the pattern by examining the general vicinity to determine the extents of the pattern and surrounding void space (12), determining the orientation (top) of the pattern, and if necessary, prompts an operator that the input has been validated. The latter step is essentially important to minimize user effort required for cleaning contaminants from the surface of a tightening specification marking to enable reading.

STEPS (202) AND (203) jointly correlate the presence or lack of pixel (14) markings at each pixel location with a particular numerical digit within a three-digit numerical code. For illustration purposes, each pixel location within FIG. 3A can be identified by two numbers indicating its row (top to bottom) and column (left to right), respectively. For instance, the upper left pixel location within the 3 pixel by 3 pixel tightening specification pattern (9) shown in FIG. 4A is denoted pixel [1,1]. The first of three digits is defined by the presence or lack of pixel marking at position [2,2]. If a marking is present, the leading digit of the three-digit number is 1. If a marking is absent, the leading digit is a 0. The second digit is jointly defined by the four pixel marking locations beginning at the upper left [1,1] and continuing clockwise up to and including pixel location [2,3]. The presence of a pixel location marking [1,1] corresponds to 1, while the absence corresponds to 0. The presence of pixel location marking [1,2] corresponds to a 2, while the absence corresponds to a 0. The presence of pixel location marking [1,3] corresponds to a 3, while the absence corresponds to a 0. Finally, the presence of pixel location marking [2,3] corresponds to a 4, while the absence corresponds to a 0. The arithmetic sum of the digits corresponding to pixel locations [1,1], [1,2], [1,3], and [2,3] give the second digit of the three-digit number. Where the sum of these four digits equals the maximum possible 1+2+3+4=10, the second digit of the three-digit number is 0. Where the sum of these four digits equals 0, an error is returned. The intent of this error proofing is to ensure an input is required to decode a zero, rather than the absence of an input. The final digit of the three-digit number is similarly jointly defined by pixel locations [3,3], [3,2], [3,1], and [2,1], corresponding to 1, 2, 3, and 4, respectively. Note that the third digit logic also follows a clockwise direction for consistency and simplicity. The final digit of the three-digit number is found by the arithmetic sum of the numbers corresponding to pixel locations [3,3], [3,2], [3,1], and [2,1]. Again, where the sum of these four digits equals the maximum possible 1+2+3+4=10, the second digit of the three-digit number is 0. Where the sum of these four digits equals 0, an error is returned.

STEP (204) displays the three-digit number and indicates the appropriate units of the number according to a standard rule. For instance, the units of "lb·in." might be appended to the three-digit number to indicate a minimum target torque (rotation) moment specification for a particular fastener.

To the extent that additional information or pixels are shown, for example, with a broken section (50 or 61) or a fourth row or column of pixels, step (205) determines any additional information for the tightening specification.

Figure 5A:
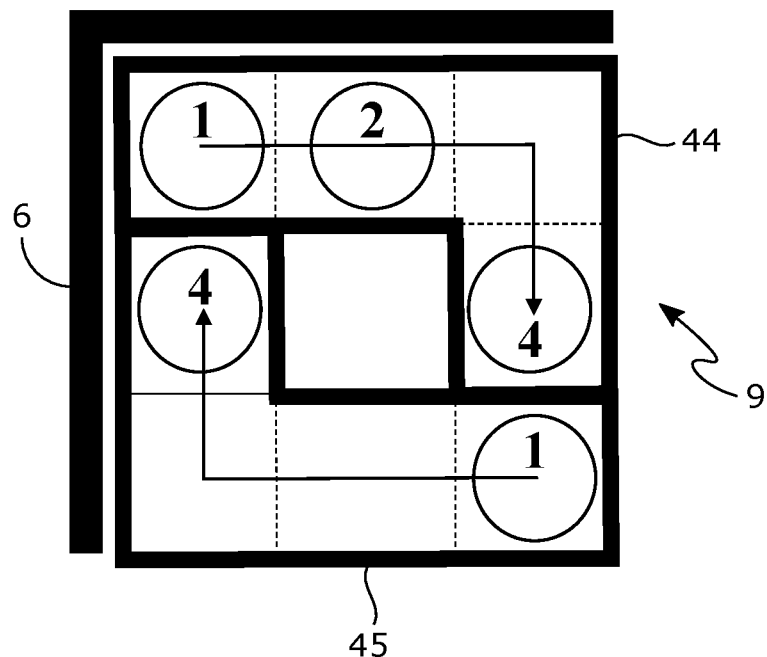
FIGS. 5A-5C detail certain solutions based on a simple algorithm for conveying certain fastener specifications according to the present embodiments.

A decoding example for a three-digit 3 pixel by 3 pixel tightening specification marking pattern (9) is shown in FIG. 5A. Note that the leading digit is 0 due to lack of a marking in pixel location [2,2]. The second digit is computed using the four upper pixel locations indicated by the thicker line border, forming an upper L shape (44), while the third digit is computed using the four lower pixel locations indicated by a thicker line border, also in a lower L shape (45). The second digit is decoded as 1+2+4=7, because there is no pixel at the position relative to the "3" value, while the third digit is decoded as 1+4=5, as there is no pixel at either of the "2" or "3" position values. Therefore, the three-digit number stored within the 3 pixel by 3 pixel tightening specification marking of FIG. 5A is 075. Appropriate units (e.g., "lb·in.") can be added prior to user display according to a predefined standard or other unit assignment mechanism (e.g., a broken indexing line segment [47 or 60]).

Figure 5B:
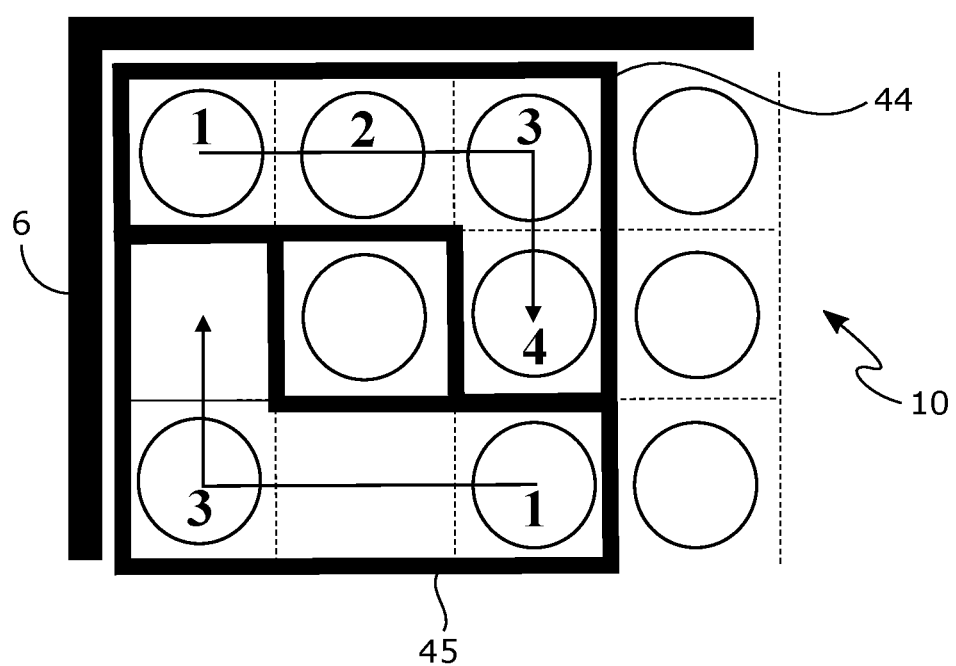

A nonlimiting decoding algorithm for a 3 pixel by 4 pixel tightening specification marking pattern (10) capable of storing three-digit numbers within the range of 0-199 and up to three additional tightening attributes is shown in FIG. 4B and FIG. 5B. Where decoding steps are similar to a 3 pixel by 3 pixel tightening specification pattern, a detailed explanation is omitted.

STEPS 1 THROUGH 4 are similar to those procedures detailed for a 3 pixel by 3 pixel tightening specification pattern (9) to orient and decode a three-digit number from 0-199.

STEP 5 correlates the presence or lack of a pixel marking at each of the three pixel locations on the rightmost side of the pattern (locations [1,4], [2,4], and [3,4]) as shown in FIG. 4B to specific tightening specification attributes. In this nonlimiting example, presence of a marking at pixel location [1,4] indicates that the fastener may be reused during maintenance. The absence of a marking in location [1,4] indicates that the fastener is nonreusable and should be discarded and replaced during service. Similarly, the presence of a marking in pixel location [2,4] alerts that a thread locking compound is not specified for use in this location, with the absence of a marking indicating thread locking compound is required. Finally, the absence of a marking in pixel location [3,4] indicates the particular fastener is a critical fastener that should be tightened as part of a manufacturer required sequence, while a marking in this location indicates the fastener can be installed and tightened independent of other fasteners. The illustrative steps here are nonlimiting and can be adjusted for ease of use and manual decoding.

STEP 6 displays the three-digit minimum target torque (rotating) moment specification and up to three independent attributes to the user.

A decoding example for a three-digit and three-attribute 3 pixel by 4 pixel tightening specification marking pattern (10) is shown in FIG. 5B. Note that the leading digit is 1 due to the presence of a marking in pixel location [2,2]. The second digit is computed using the four upper pixel locations indicated by the thicker line border forming an L shape, while the third digit is computed using the four lower pixel locations indicated by the thicker line border forming an L shape. The second digit is decoded as 1+2+3+4=10, so zero, while the third digit is decoded as 1+3=4. Therefore, the three-digit number stored within the 3 pixel by 4 pixel tightening specification marking of FIG. 5B is 104. Appropriate units (e.g., "lb·in.") can be added prior to user display according to a predefined standard. Presence of a marking in position [1,4] indicates that the fastener is reusable, presence of a marking in position [2,4] indicates that no thread locking compound is specified, and presence of a marking in position [3,4] indicates that the fastener can be independently tightened without using a particular manufacturer specified sequence of adjacent fasteners.

Figure 4C:
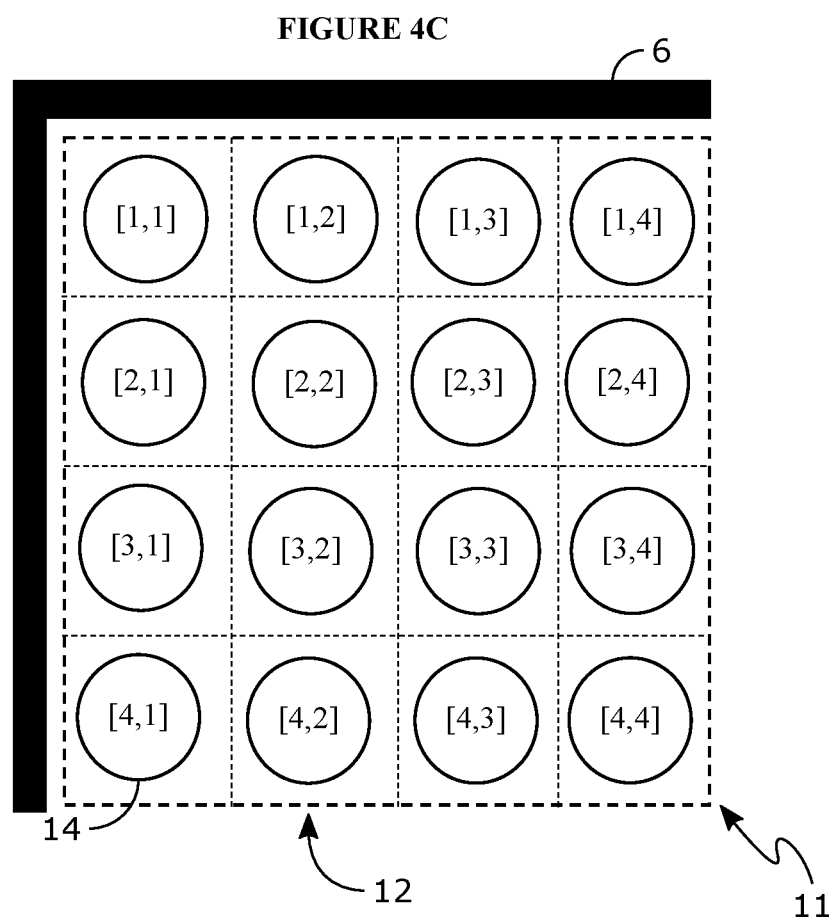

A nonlimiting decoding algorithm for a 4 pixel by 4 pixel tightening specification marking pattern (11) capable of storing three-digit numbers within the range of 0-999 and up to three additional tightening attributes is shown in FIG. 4C. Where decoding steps are similar to prior tightening specification pattern, a detailed explanation is omitted.

STEP 1 consists of similar pattern and orientation identification.

STEPS 2 AND 3 jointly correlate the presence or absence of markings in various positions to a three-digit number. The first digit is defined by markings in pixel locations in the first column, from top to bottom, including [1,1], [2,1], [3,1], and [4,1]. The presence of a marking in position [1,1] corresponds to a 1, [2,1] corresponds to a 2, and so on, up to 4. The arithmetic sum of the first column of numbers gives the first of three digits. A maximum possible sum of 1+2+3+4=10 corresponds to a 0, while a sum of 0 returns an error. Columns 2 and 3 of the pattern are similarly decoded to provide the second and third digit of the three-digit numerical number.

STEP 4 display the three-digit number, including appropriate units.

STEP 5 correlates the presence or absence of markings in pixel positions [1,4], [2,4], [3,4], and [4,4] to tightening specification attributes. In this case, an additional attribute is added to indicate the thread direction of the fastener. Presence of a marking in pixel location [4,4] indicates a lefthand thread, while absence of a marking in this location indicates a more common righthand thread.

STEP 6 displays the three-digit number, including appropriate units, and the up to four independent attributes to the user.

Figure 5C:
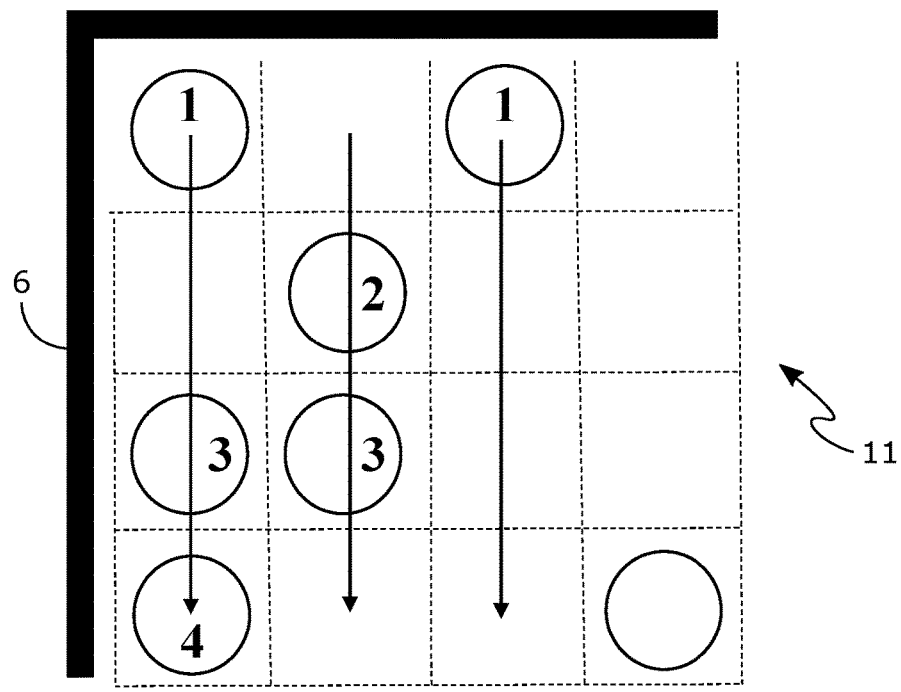

A decoding example for a three-digit and four-attribute 4 pixel by 4 pixel tightening specification marking pattern (11) is shown in FIG. 5C, with the hundreds digit being the first column, the tens digit the second column and the ones digit the third column. Note that the leading digit is computed as the sum of 1+3+4=8 due to the presence of markings in pixel positions [1,1], [3,1], and [4,1]. The second digit is computed as the sum of 2+3=5 due to the presence of markings in pixel positions [2,2] and [3,2]. The third digit is computed as 1 due to the presence of a marking in pixel position [1,3]. Therefore, the three-digit number stored within the 4 pixel by 4 pixel tightening specification marking of FIG. 5C is 851. Appropriate units (e.g., "lb·in.") can be added prior to user display according to a predefined standard. Absence of a marking in position [1,4] indicates that the fastener is nonreusable and should be replaced during service, absence of a marking in position [2,4] indicates that thread locking compound is specified, absence of a marking in position [3,4] indicates that the fastener is part of a manufacturer critical sequence involving other fasteners, and a marking in position [4,4] indicates the fastener is a lefthand thread and should be turned counterclockwise during tightening.

Figure 6A:
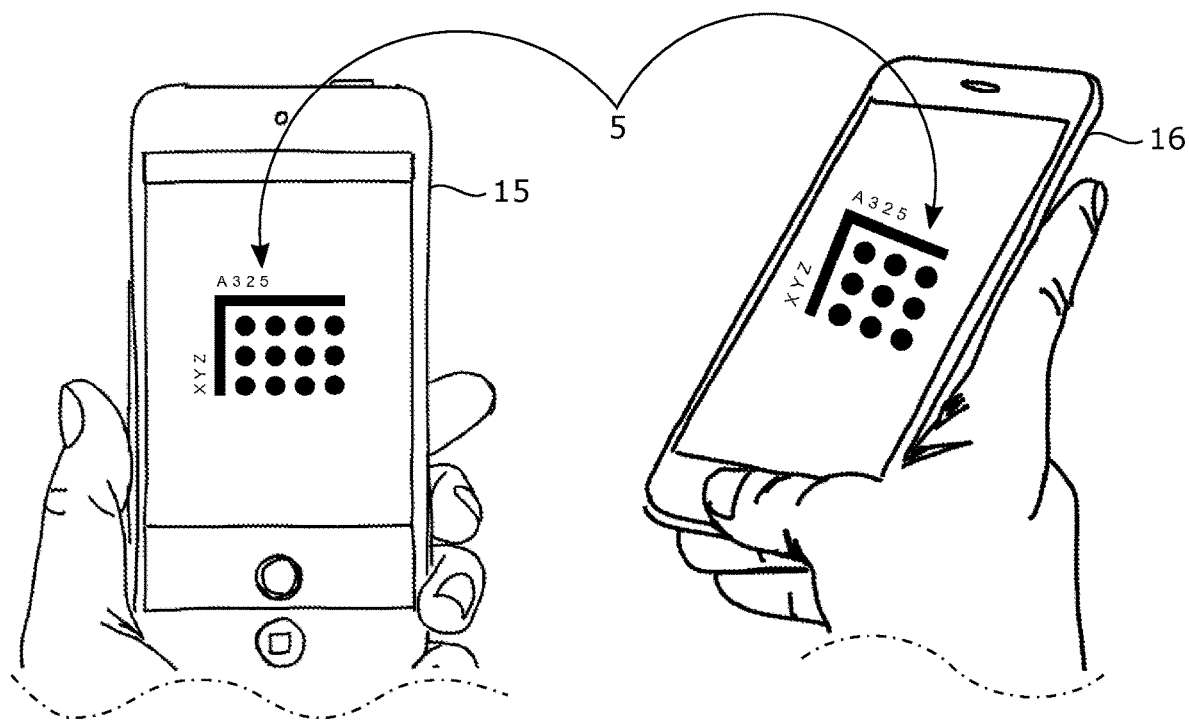
FIGS. 6A-6C detail certain scanning options for using an electronic sensing element to detect fastener specifications according to the present embodiments.
Figure 6B:
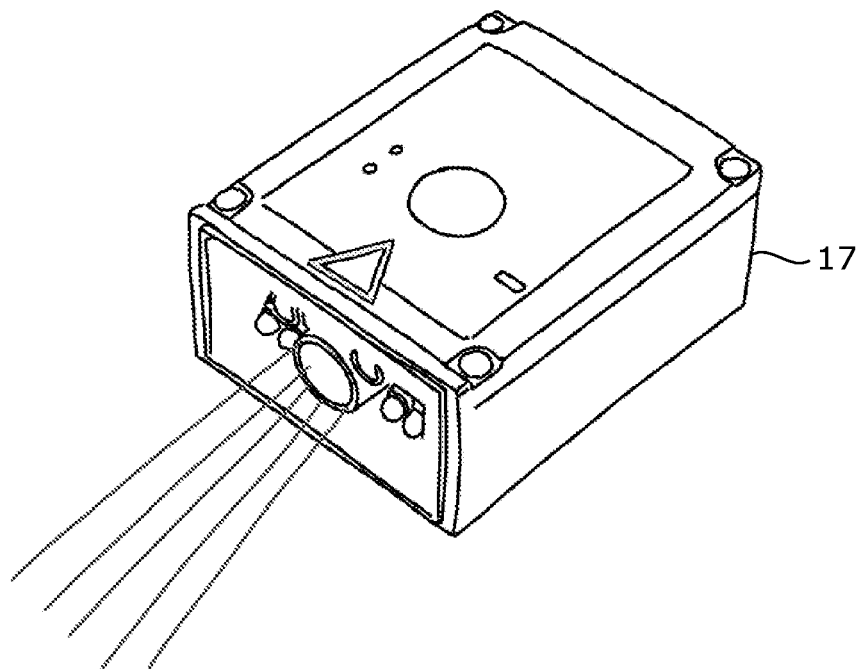
Figure 6C:
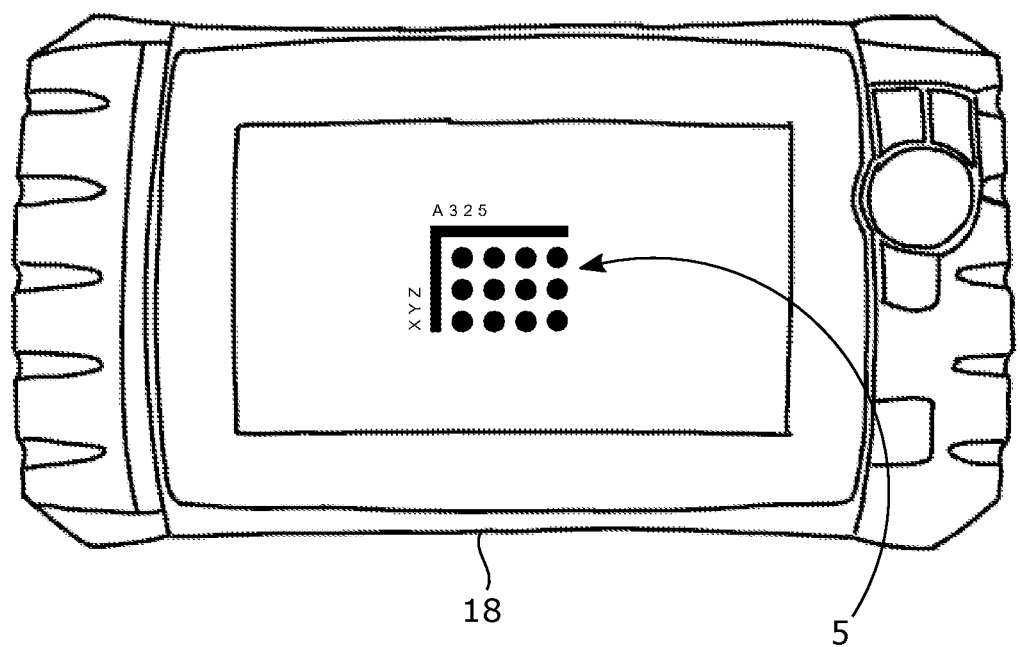

In addition to being manually decodable, the decoding of tightening specification marking dot patterns (5) can also be automated using optical scanners, cameras, microcomputers, display interfaces, or various combinations thereof. Most simply, an existing smartphone (15) or tablet computer (16) as shown in FIG. 6A may be used to automate the reading and decoding of standardized tightening specification markings. In this application, a specialized software application is developed to leverage existing hardware and software of the smartphone or tablet computer. For instance, a specialized application is launched for download on an existing vendor application marketplace that is accessible from the phone. Upon downloading and installing the application, a user is able to follow prompted instruction to scan a tightening specification using an integrated camera, decode the tightening specification, and display the stored information. The universality of smartphones (15) and tablets (16) offer distinct advantages to encourage widespread implementation of this technology with little or no initial investment from users. For assembly and manufacturing implementations, it is likely that the optical scanning, decoding, and display of tightening specifications will be incorporated into existing manufacturing systems using available optical scanners (17), as depicted in FIG. 6B. For repair and maintenance applications, the capability to read and decode tightening specifications will be incorporated into diagnostic scanning tools (18) that are commonly used to communicate with automotive or other vehicle electronic control units (ECUs) for diagnostic and maintenance purposes. Most currently available handheld diagnostic scanning tools (18), as depicted in FIG. 6C incorporate cameras or other optical scanners that would be appropriate for this added functionality, wherein a camera would scan the tightening specification marking dot pattern (5) which would then be analyzed to yield the specific tightening specification set forth by the pixels (14) with the pattern.

Various methods, data processing strategies, and optimization algorithms exist for the efficient decoding of information stored in bar codes or other information storage markings. Two nonlimiting examples of currently available representative methods and data processing strategies are reviewed here. Most commonly, an optical scanner encodes image data into an electronic file that stores information regarding the presence of reflected light within an image. This electronic file is then manipulated by a computer according to a prescribed algorithm to validate input and facilitate decoding of a string of numbers or letters. For instance, various pixels within a captured image of a tightening specification marking may be examined for the presence of a pixel marking to validate whether each predefined location contains a marking. More recently, advancements in machine learning have offered alternate image recognition and classification methods. In these more recently developed methods, a machine learning engine is trained using a series of input images and then, can recognize similar future images it encounters and classify them based on similarity to past images. An example of a relevant machine learning algorithm is a sample application developed by Apple Inc. as presented at the 2019 Worldwide Developers Conference (WDC) aimed at recognizing the result of a physical gaming dice roll using machine learning and displaying the information to a user. While the sample application is trained to recognize a physical result of a six-sided game dice roll, the technology can be similarly trained to recognize tightening specification markings by compiling a relevant training data set for the machine learning engine.

Thus, the system would be able to detect the index marking and then detecting the grid pattern, whether 3×3, 3×4, 4×4, or other sizes. Upon detection of the proper size, an application, using an optical element, such as a camera, can capture the position of the pixels and decode the elements according to the appropriate size and features of the markings. Thus, a handheld phone would easily be able to quickly provide a readout of the specific information coded on the device.

Figure 7A:
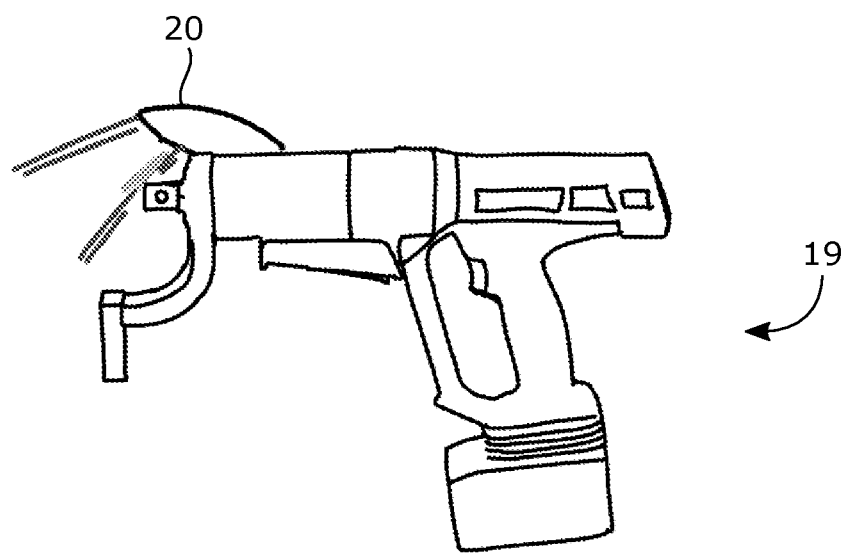
FIGS. 7A-7D detail different automatic or semiautomatic solutions, with FIG. 7A depicting an electrically actuated torque tool having an integrated scanning element, FIG. 7B depicting a manually actuated torque tool with an integrated scanning element.
Figure 7B:
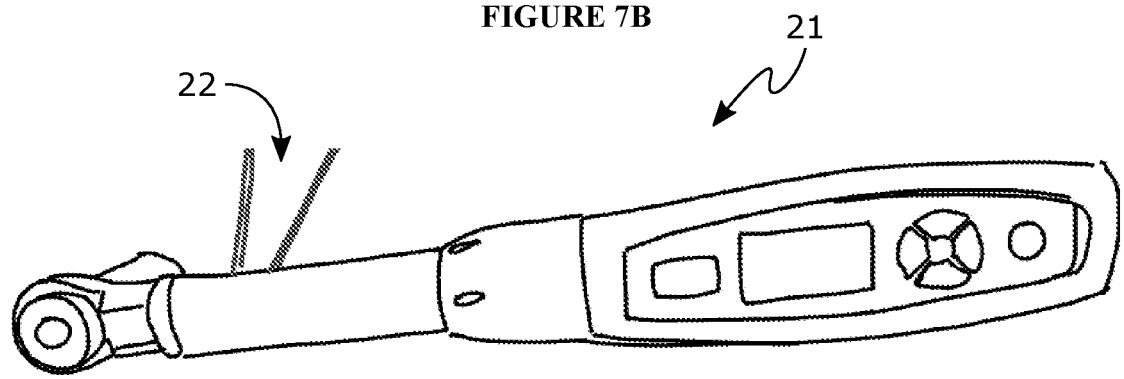

A first logical extension of the automated ability to read, decode, and display information stored within a tightening specification marking is to incorporate this capability into existing torque tools during tool design and manufacture. For instance, an electronically actuated electronic torque tool (19) or a manually actuated electronic torque tool (21)

as shown in FIG. 7A may be equipped with a protruding optical reader (20) or a concealed optical reader (22), as detailed with FIG. 7B, input keypad, and display screen to solicit user input and capture, decode, and display appropriate tightening specifications for a selected threaded mechanical fastener. Incorporation of decoding capability into existing electronic torque tools is convenient because an onboard battery power supply is already available. The electronic torque tool (19) can then be manually manipulated to the specified torque value as determined by the optical reader (20) and then utilized by the end user.

Figure 7C:
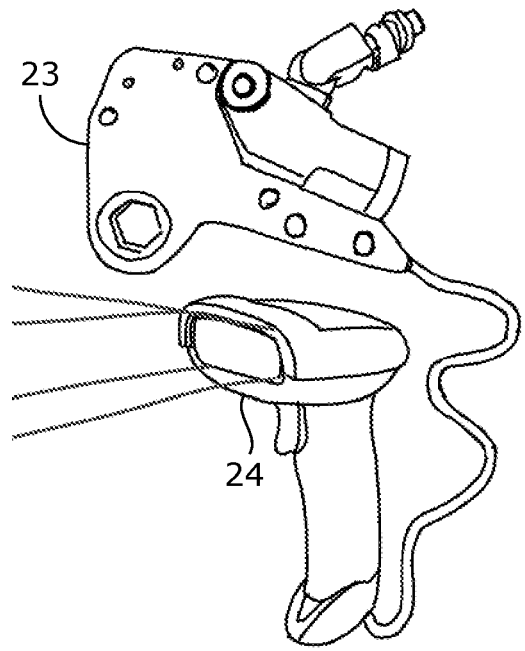
Figure 7D:
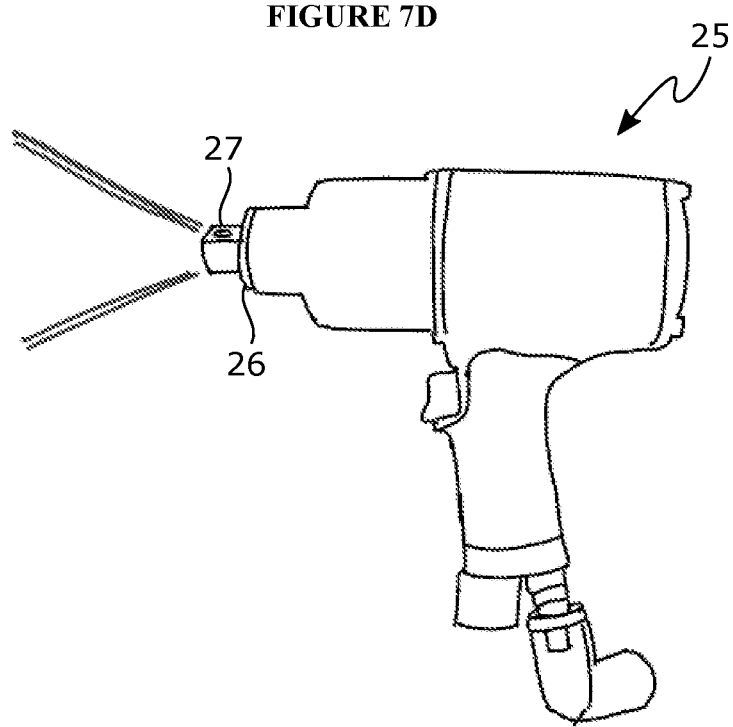

Capability for the reading, decoding, and display of tightening specifications can also be added to other torque tools including hydraulically actuated tools (23) as shown in FIG. 7C, pneumatically actuated tools (25) as shown in FIG. 7D, or any other classification of torque producing tool. FIG. 7C shows a detached optical reader (24), while FIG. 7D shows an optical reader incorporated into a torque tool's head (26) or drive square (27). The combinations of torque tool actuation method and optical reader position shown in FIG. 7A-7D are nonlimiting and may be combined as convenient for tool design and operation.

A second logical extension of the automated ability to read, decode, and display information stored within a tightening specification marking is to retrofit existing torque tools with the ability to read, decode, and/or display stored tightening specification markings on threaded mechanical fasteners. Such retrofit kits are intended to operate semi- or fully independently in the vicinity of existing torque tools relying on independent battery supply or drawing power from an existing powered torque tool supply. Optical scanners, input keypads, microcomputers, and display units may be positively fastened to the torque tool or wirelessly communicate among some fastened and some remote components using available wireless data transmission protocols (nonlimiting examples include Bluetooth and wireless ethernet communication protocols). For example, the protruding optical reader (20) shown in FIG. 7A may be an independent battery-powered Bluetooth unit adhered to the torque tool with adhesive or mechanical fasteners or the drive square (27) in FIG. 7B may be equipped with an independent battery-powered Bluetooth unit that reads fastener head markings and wirelessly transmits that data to a nearby microcomputer, tablet, or display screen.

Figure 8:
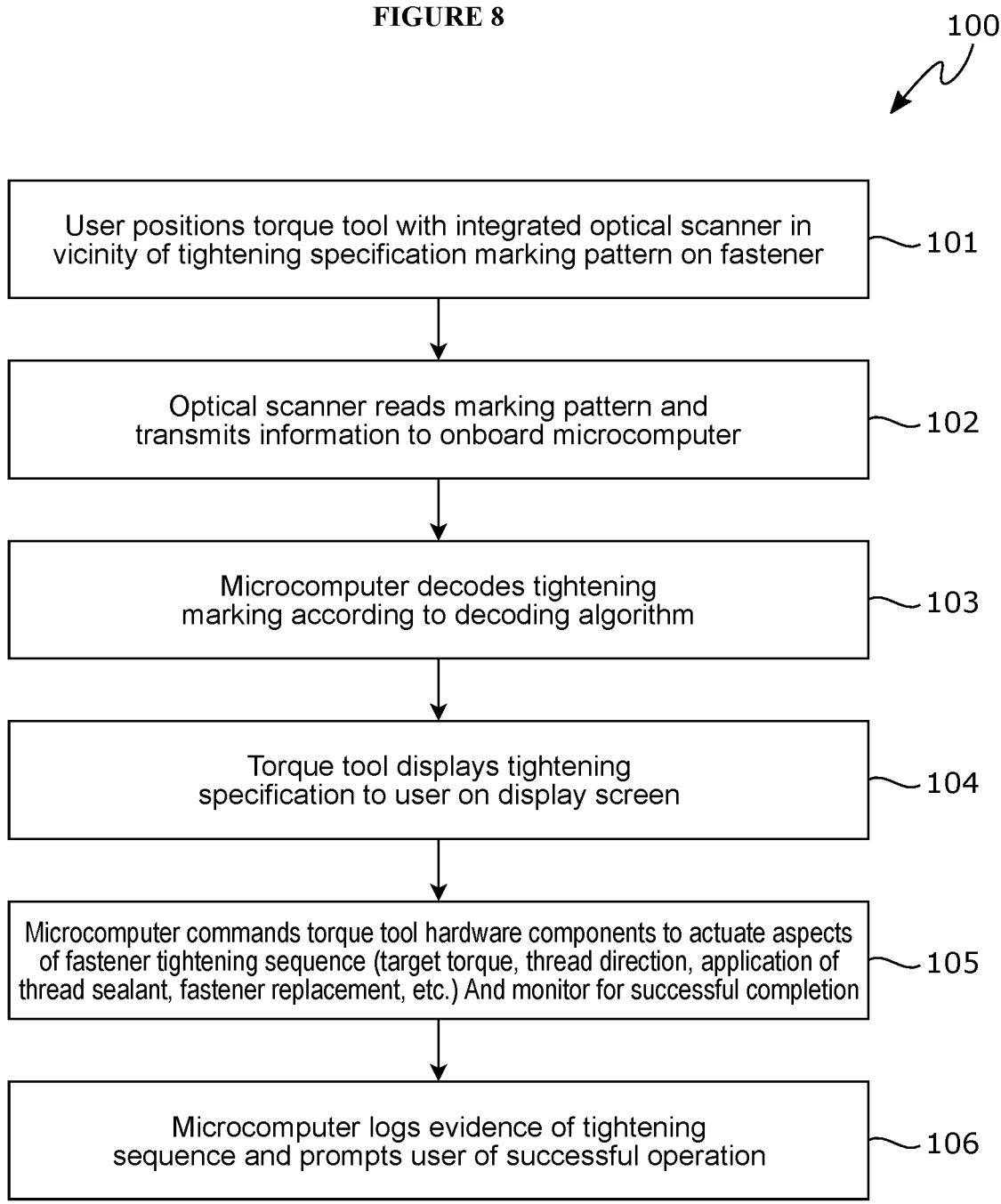
FIG. 8 depicts a flowchart for semi- and fully automated torque tool control as provided by the present embodiments.

A third and perhaps most useful logical extension of the automated ability to read, decode, and display information stored within a tightening specification is semi- or fully automatic directive control of torque tools. Depending on the extent of desired automation, a torque tool or assembly system may require manufacturer or retrofitted appropriate control hardware (e.g., microcomputer, automated material retrieval and handling systems, and/or automated thread sealant dispensers) and appropriate feedback sensors (e.g., position sensors and torque load cells). Detached torque load cells or smart sockets that incorporate load cells are commonly available feedback sensors for this purpose. In the simplest implementation, an existing torque tool, which already incorporates onboard battery power, a microcomputer, a torque load cell, and user input/display hardware, can receive an automatic commanded torque setting by optically scanning a tightening specification marking on the head of a threaded mechanical fastener. A sample logic chart (100) is illustrated in FIG. 8 and described below:

At step (101), a torque tool user positions an associated optical scanner (either attached, detached, or incorporated within the torque tool) with a view of a tightening specification marking pattern on a fastener head.

At step (102), the optical scanner reads the marking pattern, encodes the information, and transmits to an onboard microcomputer, At step (103), the microcomputer decodes the tightening marking in accordance with a prescribed universal decoding algorithm.

At step (104), the torque tool screen displays the tightening specification information to the user and, if desired, prompts user for permission to begin tightening or loosening sequence.

At step (105), the microcomputer issues command to torque tool to actuate desired hardware and monitors for sensor input for task completion. For instance, a torque tool may command a particular minimum required torque (rotation) moment, actuate a tightening sequence, and monitor feedback from a torque load cell to determine command completion. Alternately, a torque tool may command a particular direction of torque (rotation) for a particular fastener, the automatic application of thread sealant, the automatic application of preheat to a fastener prior to loosening, and/or automatic fastener replacement from an automated material storage and retrieval system.

At step (106), after successful completion of the commanded tasks, the microcomputer is able to log evidence of tightening sequence and prompts user of the successful operation.

The implementation for semi- or fully automated control of torque tools described above offers substantial improvements in efficiency and time savings in manufacturing and maintenance/repair applications. As many manufacturers of torque tools begin to incorporate onboard electric torque load cells within prototype equipment, many stock torque tools already contain much of the prerequisite hardware to add capability for semi- or fully automatic tool control using tightening specification markings. Any existing torque tool or torque applying technology is a prime candidate for incorporation of semi- or fully automatic tool control, including, but not limited to, the common torque tools shown in FIGS. 7A-7D.

In certain applications, electronic devices such as those of FIGS. 7A-7D may have electronic ports or have wireless connectivity to allow a retrofit kit to then communicate with the device, so as to then modify the torque settings on the device semi- or automatically, instead of requiring a user to enter the value of the various devices. Thus, tools can be retrofitted to incorporate an external scanner and modify a tool or communicate with the tool for changing of torque values and logging of data, as nonlimiting examples.

Furthermore, the ability to store information related to each fastener, and the application of the necessary rotational moment to tighten the fastener to such force offers distinct advantages for quality control. This allows for each fastener to be confirmed with regard to the proper sequence of tightening, the proper torque applied, the fact that a replacement or new fastener was utilized, etc., and to store such information for ensuring quality control over the torque application. Thus, should an error or problem occur, the data can confirm that the error did not original due to negligence of applying the appropriate force to the fastener. One classic example is that of a motor vehicle, which requires certain torque to secure lug nuts to secure a tire. If the motor vehicle is driving and the tire suddenly falls from the vehicle due to improper torque applied, a service station can provide records that it applied the appropriate torque and other features to secure the tire, so as to limit its exposure and risk, and to point the issue to another party who must have removed or disturbed the lug nuts on the particular tire on that motor vehicle.

Another benefit to the storage, recall, and use of tightening specifications on threaded mechanics fasteners is that microcomputer systems can leverage the data stored within a tightening specification marking for a particular application to deduce additional information regarding a connection. For instance, consider the example of a semiautomated torque tool being used to decode a tightening specification marking on a 1999 Jeep Wrangler Sport vehicle. If decoding of the tightening specification marking reads a 127 ft·lb specification with a nonreusable bolt, the microcomputer may be able to conclude that the only such fastener on a 1999 Jeep Wrangler Sport is a front right upper control arm fastener. By indirectly identifying the fastener by vehicle model and tightening specification, a user may be prompted to automatically reorder a nonreusable fastener, automatically order a particular thread sealant or connection gasket, move to the next fastener in a manufacturer critical sequence, and/or retrieve additional information (e.g., bolt size, wrench size, etc.) from a database of stored information to assist the technician or robot in a manufacturing or repair operation.

One particularly useful scheme to maximize a microcomputer's ability to deduce additional information from tightening specification markings is to assign minor deviations in tightening specifications to otherwise identical fasteners within a group. Minor deviations in minimum torque specifications are somewhat trivial to a given application. For example, the difference between a 128 ft·lb specification and a 127 ft·lb specification represents a difference of less than 1.0% between fasteners. A manufacturer might introduce and leverage such a minute difference in specifications among fasteners to assist the microcomputer in the identification of unique fasteners, groups of fasteners, or sequences of tightening. An example of such an implementation might be a grouping of six wheel lug nuts that use single-digit decreasing torque specifications (e.g., 106 ft·lb, 105 ft·lb, 104 ft·lb, etc.) to facilitate confirmation that each of the six unique wheel lug nuts was tightened independently. By successfully documenting a tightening sequence for each of the six different torque specifications a microcomputer can retain evidence that each of the six fasteners was individually installed and tightened. To combat the potential temptation for a technician to cheat and position the tool on only one fastener and incrementally tighten and document that fastener in an ascending direction (e.g., 101 ft·lb, then 102 ft·lb, etc.), the microcomputer might require decreasing torque sequence for the six fasteners (e.g., 106 ft·lb, 105 ft·lb, etc.) and temporary lock out the ability to reverse the head direction during the tightening sequence. Other similar programming safeguards are possible to encourage compliance with OEM tightening specifications during repair and maintenance of critical components with prescribed tightening sequences (e.g., fasteners connecting engine head to engine block).

Figure 9A:
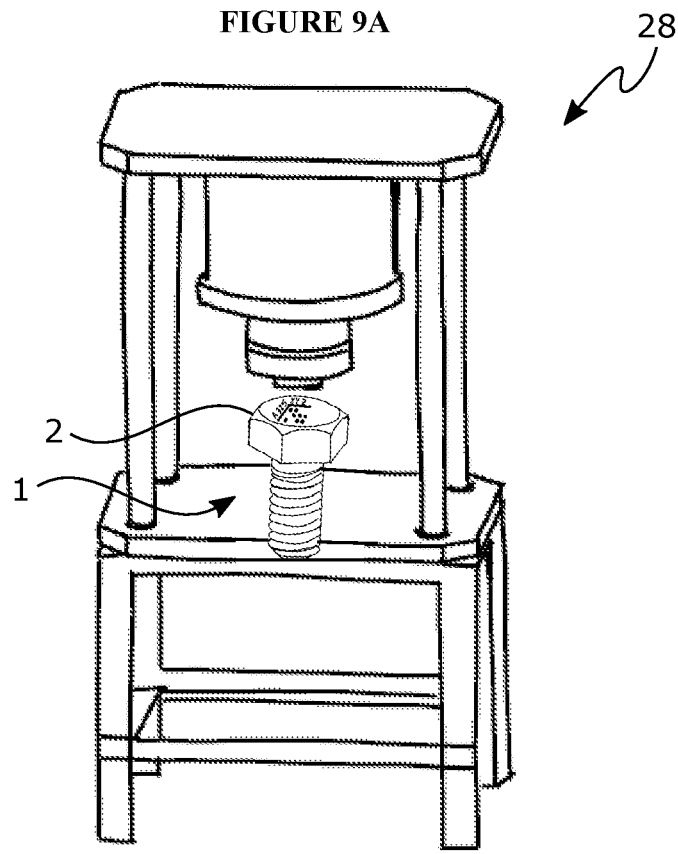
Figure 9B:
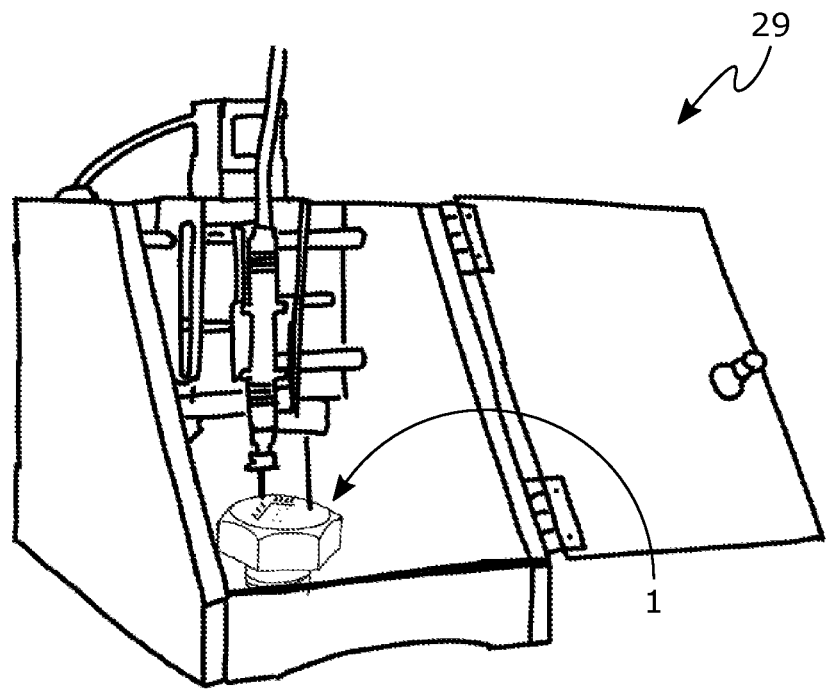
Figure 9C:
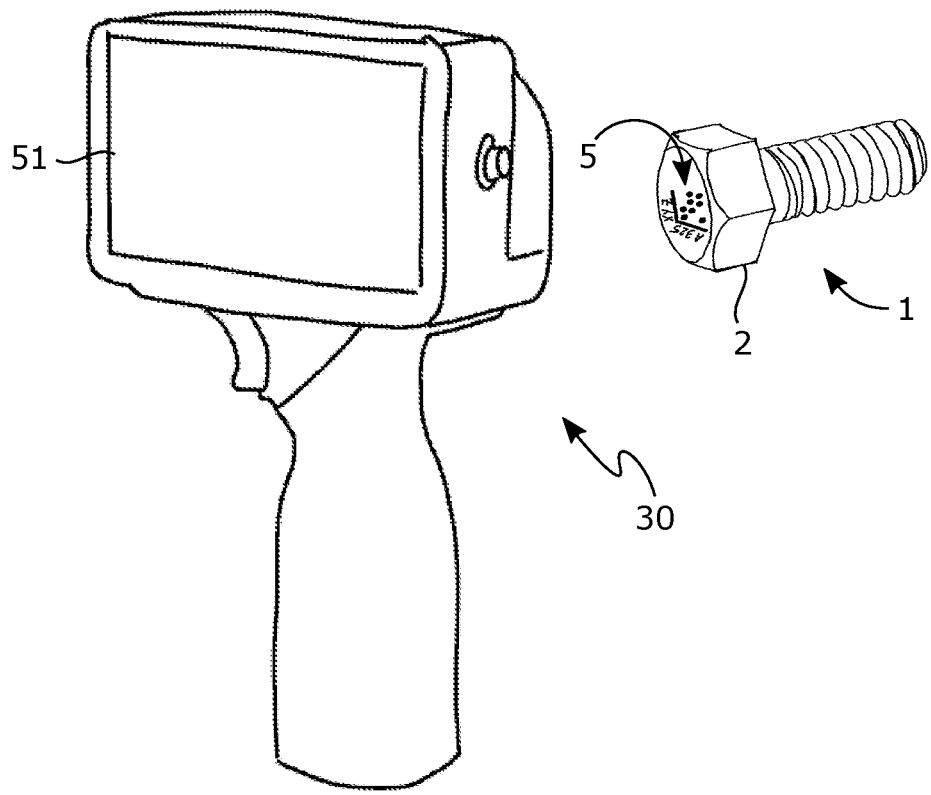
Figure 9D:
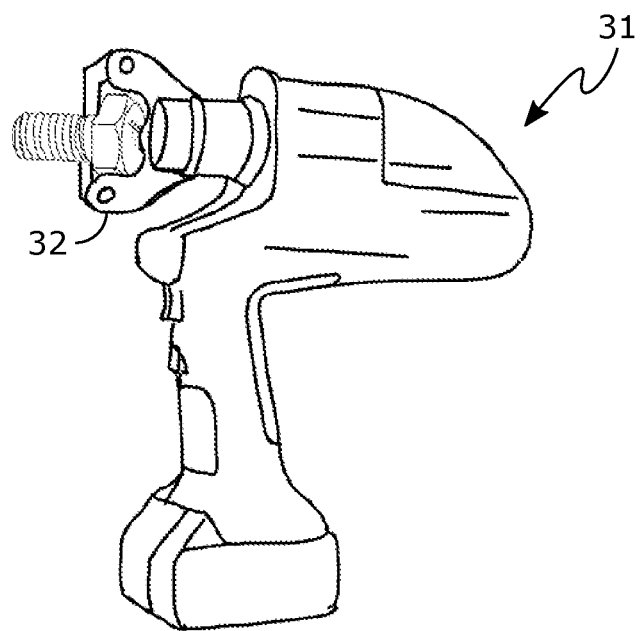

To maximize the utility and potential for industry standardization of tightening specification markings, it is essential that fastener markings can be made precisely, consistently, and inexpensively. Where debossed patterns are desired, various existing metalworking techniques are capable of producing recessed markings including industrial punches and hydraulic forming tools, manual or computer numerical controlled (CNC) drilling or milling operations, and manual or CNC methods for depositing material to form the raised portions (negative image) of a desired debossed pattern. Common metalworking techniques may be incorporated into specialty tools intended to query user input and subsequently install a portion or entirety of a tightening specification marking. For instance, the hydraulic press (28) shown in FIG. 9A may be controlled by a touch screen to solicit user input and electively locate a series of independent metalworking punches in particular locations to be pressed into the head surface (2) of a threaded mechanical fastener (1). Because the pixel markings within a tightening specification pattern are quite small, the corresponding force to create each pixel marking in even very hard surfaces is easily attainable by small hydraulic presses. Similarly, FIG. 9B shows a CNC engraving tool, mill, printer, or welder (29) capable of precisely machining the surface of a threaded mechanical fastener (1) to form a tightening specification marking. Such a marking device may be standalone (e.g., marking a single fastener prior to an installation job for a windmill turbine) or implemented as part of a manufacturing assembly sequence (e.g., marking each fastener on an assembly line after initial installation). FIGS. 9C and 9D represent a handheld electronic marking unit (30) controlled with a touchscreen (51) and a handheld electrohydraulic marking tool (31), respectively, to facilitate flexible installation of tightening specification marking dot patterns (5) on the head surface (2) of individual threaded mechanical fasteners (1). Any such handheld tools may incorporate positioning vices or clamps (32) to assist in securing and locating a threaded mechanical fastener during marking. Manual marking tools such as those shown in FIGS. 9E, 9F, and 9G allow for installation of tightening specification markings using a template (52) and commonly available hand tools including punches (54), drills (53), and hammers (55). Templates (52) may be made of any relatively rigid material that preserves the relative distance between marking locations and facilitate alignment in a particular location on a fastener head.

For instance, FIG. 9E shows a threaded mechanical fastener (1) after initial installation of an indexing mark (6), a template (52) for a 3 pixel by 3 pixel pattern positioned by aligning the indexing mark (6) and the matching template indexing mark (56) on the template (52). As depicted by FIG. 9F, the template (52) can be placed onto the head (2) of the threaded mechanical fastener (1), and specifically where the either embossed or debossed orientation mark (6) is paired with the template (52). Preferably, for a debossed orientation mark (6) the template (52) will have a corresponding convex component (e.g., the template indexing mark [56]) that fills the debossed orientation mark (6) like a lock and key orientation, thus securing the template (52) into position on the head. Then, as depicted by FIG. 9F, the use of a 1/16-in. diameter drill bit (53) to precisely create debossed markings at appropriate pixel locations as desired for the given tightening specification.

FIG. 9G shows a similar implementation of a template using a 1/16-in. diameter metal punch (54) and hammer (55). Templates may be single use or reusable depending on their construction and if they contain components that are sacrificial during the marking operation.

Figure 10A:
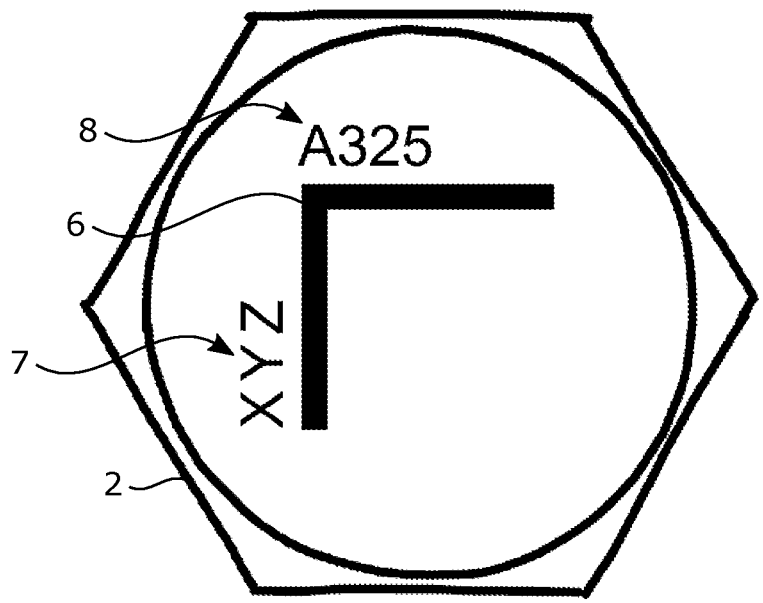
FIGS. 10A and 10B depict certain elements of manufactured and added fastener specifications depicting the dot pattern grid centrally positioned along the longitudinal axis of the head of the fastener.
Figure 10B:
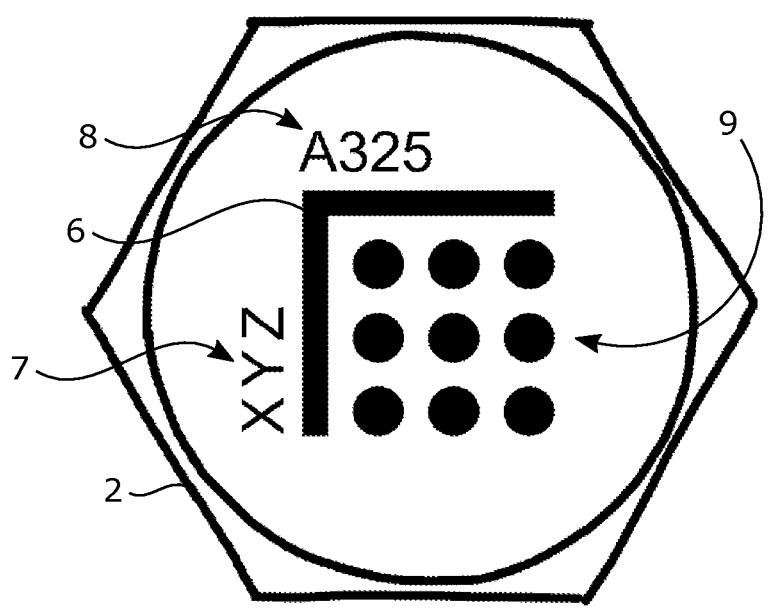

The installation of fastener information and tightening specification markings on threaded mechanical fasteners may occur simultaneously (by a single party or operation) or in multiple intermediate steps. For instance, a manufacturer of equipment might elect to simultaneously install a marking during manufacturing that stores fastener information (manufacturer [7] and grade [8]), contains an indexing mark (6) on the head (2), and contains a tightening specification. In another instance, a manufacturer of a particular fastener may elect to store only fastener information (manufacturer [7] and grade [8]) and create an indexing mark (6), as shown in FIG. 10A. The fastener head shown in FIG. 10A remains generic until it is later marked with a tightening specification marking pattern in one or more steps as shown in FIG. 10B, containing a 3×3 grid (9). If a fastener manufacturer customarily installs a standard indexing mark on their produced fasteners, it assists in locating the standard pixel locations within a pattern during future marking.

Leveraging the advantages of tightening information stored within markings, multiple novel components of supporting technology are likely to be developed and incorporated onto or within torque tools in the future. Nonlimiting examples of such components include: (a) brushes to remove dirt, grease, and other contaminants from the head of a fastener to expose tightening specification markings, (b) grinding or sanding attachments to recover damaged tightening specification markings, (c) specialty photography lights/flashes or surface treatments to assist in optical capture of the tightening specification markings, (d) electromechanical switching of drive direction (clockwise/counterclockwise) to facilitate automatic torque tool direction control, (e) automated dispensers for thread sealant incorporated directly into tool heads, and (f) integrated automatic fastener preheating assemblies to assist in loosing fasteners previously installed with thread sealant.

In certain embodiments, the threaded fastener is a nut that is being secured onto a secured bolt, for example, lug nuts. In such a case, the marking dot pattern (5) may be positioned on one face of the nut or be positioned on a surface adjacent to the secured bolt. This allows for the marking dot pattern (5) to be utilized to secure this threaded fastener, without the normal positioning on the head (2) of the bolt.

It will be appreciated that the embodiments and illustrations described herein are provided by way of example, and that the present invention is not limited to what has been particularly disclosed. Rather, the scope of the present invention includes both combinations and sub combinations of the various features described above, as well as variations and modifications thereof that would occur to persons skilled in the art upon reading the forgoing description and that are not disclosed in the prior art. Therefore, the various mechanical markings, systems and methods may include one or all of the limitations of an embodiment, be performed in any order, or may combine limitations from different embodiments, as would be understood by those implementing the various methods and systems detailed herein.

What is claimed is:

1. A surface marked threaded fastener comprising an elongated and threaded shaft and a head at one end of the elongated and threaded shaft; said head comprising on a top surface contacting face a readable matrix comprising a grid dot pattern directly positioned within the top surface contacting face of said head and a portion of said grid dot pattern located on a center point of a longitudinal axis of the threaded fastener, the grid dot pattern of the readable matrix comprising a ratio of pixel diameter to interpixel spacing of between 10:1 and 1:10, and comprising an orienting mark adjacent to said grid dot pattern, said orienting mark comprising a vertical segment extending from a lower end of said grid dot pattern, through an upper end of said grid dot pattern to a horizontal segment, said vertical segment and said horizontal segment being connected at a vertex adjacent to a corner of the readable matrix and wherein at least one portion of the readable matrix is debossed; and wherein said grid dot pattern defining a tightening specification.

2. The surface marked threaded fastener of claim 1 wherein the readable matrix comprises between 6 dots and 24 dots within the grid dot pattern.

3. The surface marked threaded fastener of claim 1 wherein the grid dot pattern is embossed, debossed, or a combination thereof within the top surface contacting face.

4. The surface marked threaded fastener of claim 1 wherein the orienting mark further describes at least a second tightening specification.

5. The surface marked threaded fastener of claim 4 wherein the second tightening specification comprises a unit of measurement.

6. The surface marked threaded fastener of claim 1 wherein the vertical segment and the horizontal segment are linear or nonlinear segments.

7. The surface marked threaded fastener of claim 1 wherein the readable matrix comprises at least three rows and three columns.

8. The surface marked threaded fastener of claim 7 wherein the readable matrix is a three-dimensional matrix comprising at least one debossed pixel within the grid dot pattern of the readable matrix.

9. The surface marked threaded fastener of claim 8 further comprising an orienting mark of between 1 pixel diameter and 0.1 pixel diameter.

10. The surface marked threaded fastener of claim 1 wherein the readable matrix is formed of debossed markings.

11. The surface marked threaded fastener of claim 1 wherein the ratio of pixel diameter to interpixel spacing is 2:1.

12. The surface marked threaded fastener of claim 1 wherein the tightening specification is selected from the group consisting of: minimum required torque moment on a fastener, a specified angle of twist, a direction of the thread, an indicator of presence of lubricants, presence of thread locking compound, a single use fastener, fastener importance, units of force, and combinations thereof.

* * * * *